United States Patent
Banatre et al.

(10) Patent No.: US 9,324,219 B2
(45) Date of Patent: *Apr. 26, 2016

(54) DEVICE AND METHOD FOR CHECKING THE INTEGRITY OF PHYSICAL OBJECTS

(75) Inventors: Michel Banatre, La Fresnais (FR); Paul Couderc, Rennes (FR); Mathieu Becus, Rennes (FR); Fabien Allard, Rennes (FR)

(73) Assignee: INRIA INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 514 days.

This patent is subject to a terminal disclaimer.

(21) Appl. No.: 12/994,015

(22) PCT Filed: May 20, 2009

(86) PCT No.: PCT/FR2009/000597
§ 371 (c)(1),
(2), (4) Date: Mar. 30, 2011

(87) PCT Pub. No.: WO2009/153435
PCT Pub. Date: Dec. 23, 2009

(65) Prior Publication Data
US 2011/0178999 A1     Jul. 21, 2011

(30) Foreign Application Priority Data

May 22, 2008  (FR) .................................... 08 02783
Mar. 9, 2009  (FR) .................................... 09 01064

(51) Int. Cl.
*G06F 7/00*      (2006.01)
*G06F 17/30*     (2006.01)
*G08B 13/14*     (2006.01)

(52) U.S. Cl.
CPC ..................................... *G08B 13/14* (2013.01)

(58) Field of Classification Search
CPC .................... G06F 17/30168; G06F 17/30557;
G06F 21/64; G06F 11/1497
USPC ................................................. 707/701, 704
See application file for complete search history.

(56) References Cited

U.S. PATENT DOCUMENTS 5,050,212 A * 9/1991 Dyson ............................ 713/187
5,295,256 A * 3/1994 Bapat ................ G06F 17/30595
707/999.003

(Continued)

FOREIGN PATENT DOCUMENTS

WO     WO 2008/021874 A1    2/2008

OTHER PUBLICATIONS

Domingues et al., "Sabotage-tolerance and trust management in desktop grid computing". Elsevier, 2006.*

(Continued)

*Primary Examiner* — Daniel Kuddus
(74) *Attorney, Agent, or Firm* — Knobbe, Martens, Olson & Bear, LLP

(57) ABSTRACT

The invention relates to a device for monitoring physical objects that comprises one or more short-range remote readers (13), memory elements (5) to be attached to physical objects, and a controller (15) adapted for executing a reading function capable of interaction with the one or more remote readers in order to acquire data contained in adjacent memory elements, and for executing an integrity validation function capable of distinguishing, from the acquired data, individual identifiers particular to each of the memory elements as well as group description data stored in at least some of said memory elements, and of checking the sufficiency of group description data while checking the compliance of individual identifiers with corresponding group description data.

20 Claims, 19 Drawing Sheets

(56) References Cited

U.S. PATENT DOCUMENTS

| | | | |
|---|---|---|---|
| 5,423,037 A * | 6/1995 | Hvasshovd | |
| 5,594,256 A * | 1/1997 | Siebert | G02F 1/0327 250/214 R |
| 5,594,918 A * | 1/1997 | Knowles et al. | 712/15 |
| 5,754,841 A | 5/1998 | Carino, Jr. | |
| 5,768,526 A * | 6/1998 | Fawcett | 709/229 |
| 5,787,437 A * | 7/1998 | Potterveld et al. | |
| 5,794,250 A | 8/1998 | Carino, Jr. et al. | |
| 5,909,571 A * | 6/1999 | Polzin et al. | 713/601 |
| 6,023,586 A * | 2/2000 | Gaisford | G06F 8/60 707/999.01 |
| 6,115,790 A * | 9/2000 | Schimmel | 711/119 |
| 6,154,823 A | 11/2000 | Benayon et al. | |
| 6,161,183 A * | 12/2000 | Saito et al. | 713/176 |
| 6,173,338 B1 * | 1/2001 | Fukuta | 710/5 |
| 6,408,392 B2 * | 6/2002 | White | 726/26 |
| 6,418,382 B2 * | 7/2002 | Rothberg | C12N 15/10 422/68.1 |
| 6,420,122 B1 * | 7/2002 | Housman | G01N 33/6896 435/4 |
| 6,424,650 B1 * | 7/2002 | Yang et al. | 370/390 |
| 6,446,087 B1 * | 9/2002 | Lai | 707/687 |
| 6,690,289 B1 * | 2/2004 | Odinak et al. | 340/9.11 |
| 6,804,700 B1 * | 10/2004 | Terek et al. | 709/203 |
| 7,257,594 B2 * | 8/2007 | Tamboli et al. | |
| 7,388,488 B2 * | 6/2008 | Lupoli et al. | 340/572.1 |
| 7,483,387 B2 * | 1/2009 | Guichard | H04L 12/66 370/252 |
| 7,577,667 B2 * | 8/2009 | Hinshaw et al. | |
| 7,668,857 B2 * | 2/2010 | Cook | G06F 17/30489 707/807 |
| 7,734,796 B2 * | 6/2010 | Schelen | H04L 12/5695 709/229 |
| 7,770,228 B2 * | 8/2010 | Carpentier et al. | 726/30 |
| 7,894,439 B2 * | 2/2011 | Yoshimi | H04L 12/66 370/392 |
| 7,904,278 B2 * | 3/2011 | Wilson et al. | 702/186 |
| 8,032,573 B2 * | 10/2011 | Richard | 707/737 |
| 2001/0047279 A1 * | 11/2001 | Gargone | 705/1 |
| 2003/0018584 A1 * | 1/2003 | Cohen et al. | 705/52 |
| 2003/0126056 A1 * | 7/2003 | Hausman et al. | 705/36 |
| 2003/0156541 A1 * | 8/2003 | Haihong | 370/235 |
| 2004/0128516 A1 * | 7/2004 | Okamoto et al. | 713/179 |
| 2005/0200487 A1 * | 9/2005 | O'Donnell | A62B 99/00 340/573.1 |
| 2005/0234860 A1 * | 10/2005 | Roever et al. | 707/1 |
| 2006/0236851 A1 * | 10/2006 | Gude et al. | 86/50 |
| 2006/0250249 A1 * | 11/2006 | Cheng | H04L 67/12 340/572.4 |
| 2008/0061982 A1 * | 3/2008 | Himberger | G06K 17/0029 340/572.1 |
| 2008/0189348 A1 * | 8/2008 | Krig | 709/200 |
| 2008/0235132 A1 | 9/2008 | Banatre et al. | |
| 2008/0243751 A1 | 10/2008 | Gormish et al. | |
| 2009/0047899 A1 | 2/2009 | Banatre et al. | |
| 2010/0161999 A1 | 6/2010 | Poovendran et al. | |

OTHER PUBLICATIONS

Elisa, B. et al. 2001 "A nested transaction model for multilevel secure database management systems" *ACM Transactions on Information and Systems Security* 4(4): 321-370.

* cited by examiner

| O_ID | O_NB | E_ID | E_ID | E_ID | E_ID |

Fig. 9

DEVICE AND METHOD FOR CHECKING THE INTEGRITY OF PHYSICAL OBJECTS

RELATED APPLICATIONS

This application is a U.S. National Phase of International Application No.: PCT/FR2009/000597, filed May 20, 2009, designating the U.S. and published on Dec. 23, 2009 as WO2009/153435A2, which claims the benefit of French Application No. 0802783, filed May 22, 2008 and French Application No. 0901064, filed Mar. 9, 2009.

FIELD OF THE INVENTION

The invention relates to a device for monitoring physical objects.

BACKGROUND OF THE INVENTION

A large number of situations require monitoring of physical objects.

For example, a very widespread fear of travelers, regardless of their transportation means, is to lose or forget part of their luggage, or further having part of the latter stolen or substituted.

Presently, there are very few solutions for reassuring the traveler, and none of them is satisfactory in practice.

Labelling of the luggage for example is only efficient if a check of the association of the luggage and of their owner is permanently carried out, or at least continuously over particularly critical periods of time, such as the stopping of a train in a railway station, recovery of luggage after disembarking, or further passing security points. Such checks do not exist or at best they are random.

In fact, every time the traveler physically moves away from his luggage including when he/she places them in a compartment provided for this purpose somewhat distant from his/her seating position, he/she is at risk.

Continuous and systematic monitoring of luggage should be able to be set up simply, in particular without the traveler having to invest in complex protection devices.

It appears to be desirable that such monitoring may be provided as a service to a greater number of travelers, without however acquiring significant investments, in particular in equipment.

It is also indispensable that this monitoring shall not interfere with presently established security and checking devices, for example for discouraging terrorism.

SUMMARY OF THE INVENTION

The invention is not only directed to the monitoring of luggage. Monitoring physical objects represents a significant goal in many other sectors, such as transport of goods, mail distribution, security of public or private establishments, for example.

The invention has the goal of improving the situation.

It is directed to a device for monitoring physical objects comprising one or more short-range remote readers, memory elements intended to be attached to physical objects, a controller adapted for executing a reading function capable of co-operating with remote reader(s) in order to acquire data contained in adjacent memory elements, and for executing an integrity validation function capable of distinguishing, from the acquired data, individual identifiers specific to each of the memory elements, as well as group description data stored in at least some of these memory elements, and of checking the sufficiency of group description data while checking the compliance of individual identifiers with corresponding group description data.

Such a device thus has the advantage of a simple inexpensive and self-contained infrastructure, mainly consisting of one or more remote readers and a controller. The physical objects may be monitored on areas of large extent, for example by multiplying the remote readers. The physical objects may also be monitored over areas of small extent.

With such a device it is possible to achieve an association of physical objects in an aggregated object. With the device, it is then further possible to check whether an aggregated object is complete or entire, in the sense that the whole of the physical objects making up the latter is present in a given area. For example, it becomes possible to check whether a traveler has the whole of his/her luggage around him/her by associating this traveler and his/her luggage in a same aggregated object.

As an example, generating an aggregated object is easy since it mainly consists in programming of memory elements and affixing the latter on the physical objects.

The device according to the invention is self-contained. It does not imply any connection to a data network, even at a local scale, as opposed to practically the whole of the present security devices. These devices actually mainly rely on establishing databases of increasing significance for marking out physical objects.

The device according to the invention does not require any adaptation of the controller to an aggregated object in particular: an aggregated object is defined by means of the programming of only memory elements, without any prior programming of the monitoring device. The result of this is low deployment costs, these costs being mainly related to the purchase and the setting-up of the remote readers. Moreover, the costs relating to memory elements and to their programming may be left at the expense of the user, since the programming may be accomplished by the user.

The device according to the invention is capable of simultaneously providing monitoring of physical objects of potentially very different nature: a same device may monitor at the same time travelers' luggage, personnel gear or further the composition of a group of persons, of paper documents, of vehicles in a car park or bicycles in a garage shared by several persons, contents of postal packets or further boxes of drugs. In other words, the device according to the invention is capable of checking the integrity of an aggregated object formed by the programming of memory elements, independently of the nature of the physical objects which bear the memory elements.

The invention is also directed to a device for monitoring physical objects, of the type comprising one or more short-range remote readers, memory elements intended to be attached to physical objects, a controller adapted so as to execute a writing function capable of co-operating with the remote reader(s) in order to write into adjacent memory elements, data of individual identifiers, specific to each of the memory elements and group description data, stored by at least some of these memory elements.

BRIEF DESCRIPTION OF THE DRAWINGS

Other features and advantages of the invention will become apparent upon examining the description detailed hereafter and of the appended drawings wherein:

FIG. 9 is a diagram illustrating an exemplary recording table for the controller of the device of the invention.

SUMMARY OF THE ANNEXES

On the other hand:

Annex 1 is an extract of a computer program in pseudo-code used in the first embodiment of the invention.

Annex 2 is analogous to Annex 1 for the second embodiment of the invention.

Annexes 3 and 4 are analogous to Annex 1 for the case when several aggregated objects are used in the invention.

DETAILED DESCRIPTION OF THE PREFERRED EMBODIMENT

The drawings and the annexes to the description essentially comprise elements of certainty. They therefore may not only be used for a better understanding of the description, but also for contributing to the definition of the invention if need be.

Figure 1:
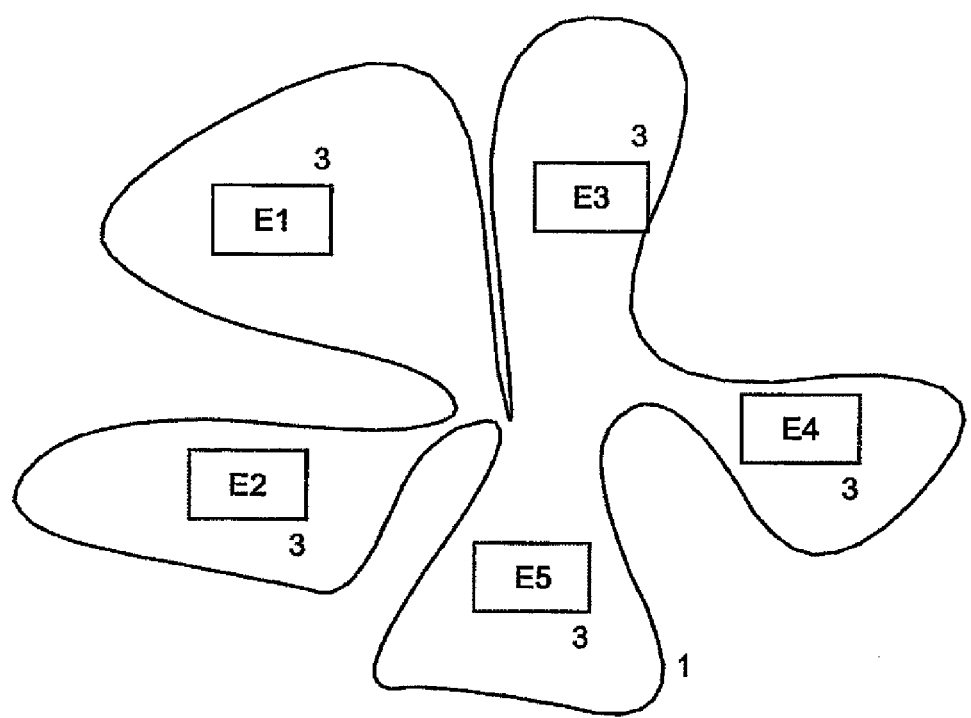
FIG. 1. is a diagram showing an aggregated object.

FIG. 1 illustrates an aggregated object 1 consisting of the union of elementary objects 3, here E1, E2, E3, E4 and E5.

Each of the elementary objects 3 here assumes the form of a memory device which may be polled at short range, designated hereafter as label 5, intended to be borne by an object or a physical person.

Each of the labels 5 making up the aggregated object 1 maintains in memory identification data which are specific to it.

Description data of the aggregated object 1 are stored in memory in at least the sum of the labels of this aggregated object 1. These description data allow an estimation of the integrity of the aggregated object 1 only from a set of data of individual identifiers of labels 5.

Preferably, each of the labels 5 further stores in memory data pertaining to the aggregated object 1 with which the individual identifier of the relevant label 5 may be associated with the aggregated object 1.

Figure 2:
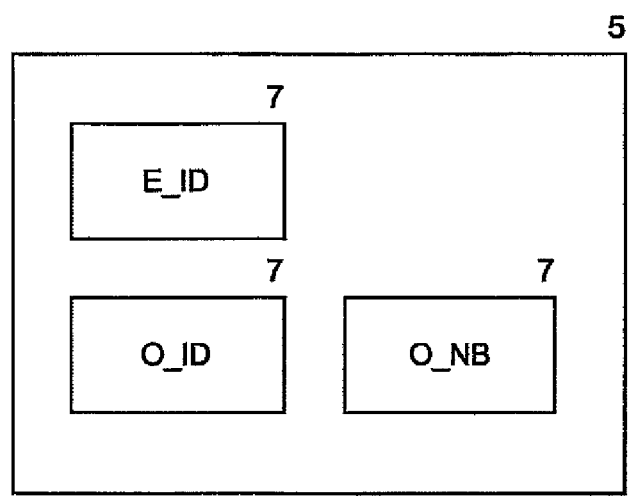
FIG. 2 is a diagram illustrating an exemplary label for the aggregated object of FIG. 1.

FIG. 2 shows an exemplary label 5.

The label 5 maintains in one or several memory areas 7, elementary identifier E_ID data, specific to the relevant label 5, object identifier O_ID data, common to the whole of the labels 5 making up the object 1, and optionally object cardinal O_NB data, indicating the number of constitutive labels 5 of the aggregated object 1.

In practice, it is sufficient that one of the labels 5 making up the aggregated object 1 maintains these object cardinal O_NB data. Such a label 5 may then be described as a master label or a master elementary object.

The description data of the aggregated object 1 here consist of object identifier O_ID data stored in memory on each of the labels 5 of the object 1 and object cardinal O-NB data stored on at least one of these labels 5.

According to a first alternative embodiment, the object identifier O_ID data may assume the form of a value resulting from a hash function generated from the whole of the individual identifier E_ID data of the labels 5 making up the aggregated object 1.

The integrity of the aggregated object 1 may then be checked by testing the agreement of the hash value with a set of individual identifier E_ID data of labels 5. For example, a hash value may be generated from these individual identifier E_ID data, by means of a hash function analogous or compatible with the hash function used for generating the object identifier O_ID, and then by comparing this value with the object identifier O_ID. The aggregated object 1 is then entire if the generated value and the object identifier O_ID are in agreement.

In this alternative embodiment, the object cardinal O_NB data are optional: the object identifier O_ID is sufficient for checking the agreement of the aggregated object 1 with a set of individual identifiers E_IDs. In other words, the description data of the aggregated object 1 here consist of the object identifier O_ID.

The property of master label may additionally be encoded in a particular label, for example by setting a reserved memory bit to the value 1.

The elementary identifier E_ID may be any identifier. This identifier may be integrated to a label 5 upon the manufacturing of the latter, for example as a universal product number.

According to a second alternative embodiment, the description data of the aggregated object 1 comprise a list of individual identifiers E_IDs of the labels 5 making up this aggregated object 1. These description data may be stored in memory of each of the labels 5, for example in order to form object identifier O_ID data. These description data may also be stored in only one of these labels 5, typically the master label 5.

In this alternative embodiment, the object cardinal O_NB data are optional: the list of the individual E_ID identifiers implicitly comprises these object cardinal O_NB data, and this list of individual E_ID identifiers is sufficient for checking the integrity of the aggregated object 1 from a set of individual E_ID identifiers.

According to a third alternative embodiment, the object identifier O_ID data assume the form of a value resulting from a hash function such that appurtenance of each of the individual E_ID identifiers in the aggregated object 1 may only be checked from the resulting value and from the relevant individual E_ID identifier. Object cardinal O_NB data are stored in memory in at least one of the labels 5, for example only in a master label.

Whichever the alternative embodiment, the object identifier O_ID is preferably statistically unique in order to avoid that labels 5 constitutive of different aggregated objects 1 be programmed as if they belonged to a same aggregated object, i.e. with a same object identifier O_ID.

For example, this object identifier O_ID comprises a prefix established from a unique identifier of the reader used for programming of the labels 5 making up the aggregated object 1.

The programming of the labels 5 may be achieved by means of a controller executing an object creation function or CREATION function. The CREATION function is laid out so as to interact with a label reader in order to control the writing of the identification data specific to each of the labels 5, of the description data of an aggregated object and as an option, data of appurtenance to the aggregated object 1, into the memory of each of the labels 5.

The CREATION function controls the writing of the individual identifier E_ID, object identifier O_ID and object cardinal O_NB data.

The CREATION function may be laid out so as to return information data on the writing operations, such as the number of programmed labels and/or the identity of the latter. In particular, the labels 5 may have an outer tinged aspect, the color of which is encoded in memory. And the CREATION function may then be laid out so as to return a list of colors corresponding to the programmed labels 5 in order to visually check proper operation of the programming.

Further as an option, the CREATION function may control the writing into memory of a service identifier S_ID in each of the labels 5 of the aggregated object 1. This service identifier S_ID allows association of the labels 5 and of the aggregated object 1 with a particular service.

The labels 5 may be write-protected and possibly read-protected, for example by means of ciphered keys.

The CREATION function may be laid out so as to write into each of the constitutive labels 5 of an aggregated object 1 sequentially, i.e. one label 5 after the other at least from the point of view of the user.

A very short-range label reader only capable of reading labels 5 which are physically presented to it one by one, is then sufficient for interacting with the CREATION function. The readers of this type generally have reduced size, so that a user may keep a specimen at home and thus program the labels 5 at his/her convenience. In this case, the controller may advantageously assume the form of a computer program product executed on a personal computer connected to the relevant reader. The relevant label reader may be portable, or at the very least mobile, so that it is for example possible to program labels 5 already affixed on physical objects.

In this embodiment, the CREATION function may receive the number of labels 5 to be programmed as a parameter, for example entered by the user. A single passage in front of the label reader of each of the labels 5 is then sufficient for programming the aggregated object 1.

Alternatively, the set of labels 5 to be programmed is read prior to the writing operation, so that the CREATION function acquires the individual E_ID identifiers of each of the labels 5 intended to make up the aggregated object 1, and establishes the number of these labels 5. This alternative is more particularly advantageous when each of the labels 5 has an individual E_ID identifier before this programming operation and when this identifier does not have to be reprogrammed. This is typically the case when the labels 5 are marketed with an individual identifier E_ID already stored in memory. This alternative is also advantageous when a hash function based on the individual identifiers E_ID is applied.

In a particular embodiment, the hash function may be applied starting with, in addition to the individual identifiers E_ID, a public key value, to which corresponds a private key value. This public key value may be integrated to the CREATION function. Alternatively, this public key may be formed by the individual identifier of a label not belonging to the aggregated object 1, so that the hash function may be common to embodiments which do not use any private key value. Several values of public keys may be integrated to the CREATION function, to which correspond values of private keys.

Still alternatively, the CREATION function may be laid out so as to react to an end instruction by writing a last label 5. In particular, this last label 5 may be a label 5 of the master type. The end instruction may be triggered by the user or automatically when a particular event occurs. In this alternative, the read and write operations for a label may occur simultaneously, from the user point of view, i.e. each of the constitutive labels 5 of an aggregated object 1 may be read and programmed before the next label 5. In other words, it is not necessary here to make a count of the constitutive labels 5 of the aggregated object 1 before programming the labels 5.

The CREATION function may also be laid out so as to write into each of the constitutive labels 5 of an aggregated object 1 simultaneously, at least from the user point of view. A label reader capable of simultaneously reading a set of labels 5 in a determined volume is then required. Such a reader may for example integrate a directional or bidirectional antenna when the labels are radiofrequency labels.

The CREATION function is then advantageously laid out so as to read beforehand the whole of the labels 5 present in the determined volume and to program the latter so as to make up a same aggregated object 1. For the user, the reading operation appears to be concomitant with the writing function. The creation of an aggregated object 1 then becomes particularly easy in that the user needs only to have a selected number of labels 5 in the determined volume in order to program an aggregated object 1 consisting of these labels 5.

In this embodiment, the determined volume may be limited so as to avoid the simultaneous programming of undesirable labels 5. This may be accomplished by means of screens which are impervious to the short-range communications means of the label reader, typically at radio frequencies, at least in the contemplated frequency range. The screens may be arranged together so as to form a programming cubicle.

When a reader is used with a very short range of the order of a few tens of square centimeters for example, the delimitation of the volume is optional, since the presence of undesirable labels 5 in this volume becomes not very likely. Materialization of the volume may nevertheless appear to be advantageous in that it allows the user to view the volume in which the labels 5 have to be placed.

Either one of the alternatives of the CREATION function may be used for creating aggregated objects 1 consisting of a different number of labels 5. A set of labels 5 making up a same aggregated object 1, may be marketed as a kit for example in automatic dispensers.

Whichever the alternative embodiment, the CREATION function may be laid out so as to be executed upon a command from a user.

The labels 5 advantageously assume the form of RFID (Radio frequency identification) type labels, which may be remotely queried via radio frequencies, over a short range. Labels of this type have a rather low cost. They also have a very restricted size and some flexibility, which allows them to be affixed on different types of supports, including a non-planar surface. Further, these labels may easily be concealed. The labels 5 may also assume the form of devices compatible with the NFC (Near Field Computing or Near Field Communication) standard.

Other forms of labels may be provided, in particular depending on future technological developments.

Figure 3:
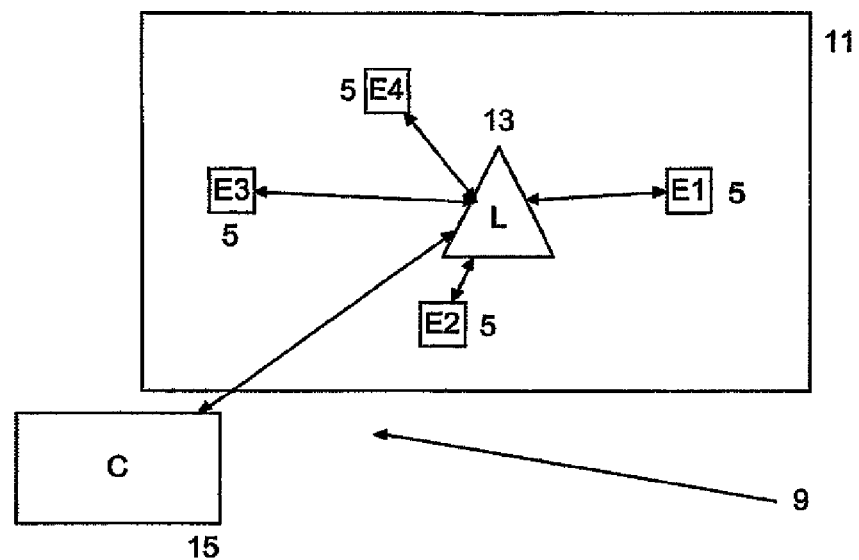
FIG. 3 is a diagram illustrating a monitoring device according to the invention.

FIG. 3 illustrates a monitoring device 9.

The monitoring device 9 comprises a label reader 13 provided with short-range communication means adapted to the type of labels 5, for example radio frequency means for RFID labels.

The label reader 13 is advantageously provided with different short-range communications means for reading different types of labels 5.

The label reader 13 is connected to a controller 15 provided with computing means and a working memory, not shown.

The controller 15 is laid out so as to execute a reading function LECT capable of co-operating with the reader 13 in order to acquire the data stored in memory in the labels 5 present within the range of the reader 13.

The LECT function is laid out so as to co-operate with the memory of the controller 15 in order to write in one or more recording tables grouping the data acquired from the labels 5 in an orderly manner.

Different structures for storing these acquired data in memory may be contemplated, in particular depending on the specific needs related to the contemplated application.

For example, the recording table may assume the form of a table with one entry, the latter grouping the individual identifiers of the labels read. Each datum associated in a label 5 with an individual identifier E-ID is stored in memory in this table, in association with the relevant individual identifier E_ID, for example in a same line of the table.

The recording table may also assume the form of a file of the log type grouping the individual identifier E_ID of each of the labels 5 read, associated with the data contained in the relevant label 5, and a read date or "time stamp", TS.

In an advantageous embodiment, each label 5 maintains in a single memory area, a juxtaposition of different required data as an individual identifier E_ID, i.e. data of appurtenance to the aggregated object 1 and if necessary, group description data. Typically, this memory area stores a chain of alphanumeric characters formed by the juxtaposition of an individual identifier E_ID portion, able to identify the label 5 in the aggregated object 1, an object identifier O_ID portion and, if necessary, of the definition of a master label attribute and/or of the object cardinal O_NB. In this case, the structure of the log file and more generally of the recording table is simplified in that it only includes a list of individual identifiers, E_IDs, and possibly associated TS reading dates.

The controller 15 is further laid out so as to execute an object checking function VAL capable of co-operating with the memory of the controller 15 in order to read the contents of the recording table 17 and determine the integrity of one or several aggregated objects 1 from data stored in memory in this table.

According to a first embodiment, the LECT function and the label reader 13 are laid out together so as to sequentially read labels 5. The recording table here assumes the form of a log file grouping the individual E_ID identifiers of the labels 5 read, the data associated with these individual E_ID identifiers, and the reading dates TS of the labels 5.

In this embodiment, a time delay DT is imposed for the passing of the labels 5 making up a same aggregated object 1.

In other words, an aggregated object 1 is entire here if the whole of the labels 5 which make it up is read within the time delay DT.

Figure 4:
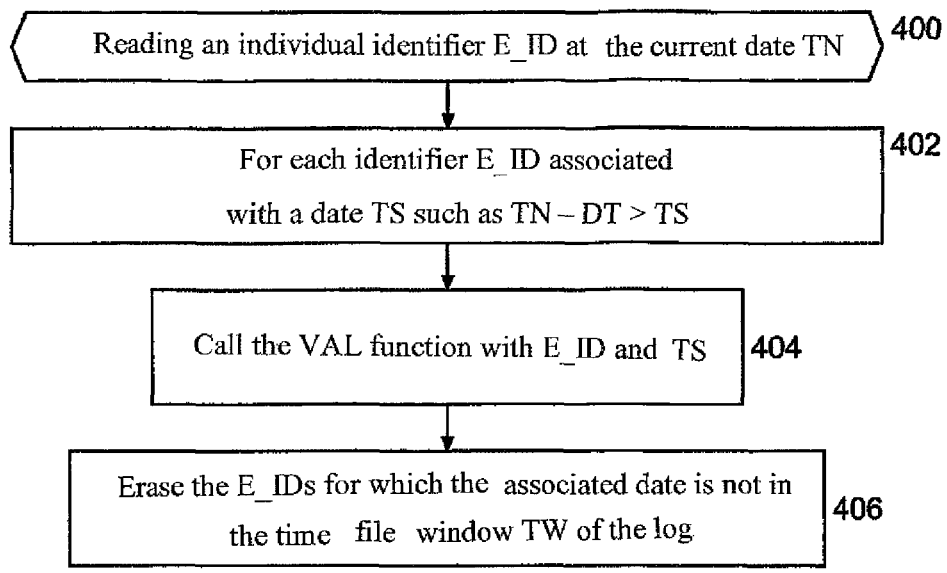
FIG. 4 is a flow chart illustrating the operation of a controller for the device of FIG. 3 in a first embodiment of the invention.

FIG. 4 illustrates the operation of the controller 15 in this embodiment.

In step 400, the LECT function and the label reader 13 co-operate for reading a particular label 5, located by means of its individual identifier E_ID. A reading date TS which has the value of the current date TN, is associated with the data extracted from this label.

In step 402, the controller 15 is laid out so as to call the VAL function with each of the individual identifiers E_ID contained in the log file, the reading date TS of which is older than the date defined by the current date TN minus the time delay DT.

As an option, the controller 15 may be laid out so as to suppress too old recordings from the log file. For example, the identifiers E_ID for which the associated reading date TS is older than the set time window value TW for the log file are deleted during step 404.

In practice, a list grouping the object identifiers, O_IDs, of aggregated objects 1 being checked, or for which checking is programmed, may be maintained in addition to the log file. If the object identifier O_ID of the label which has just been read and written into the log file is missing from this list, i.e. if the aggregated object 1 corresponding to this label is not being checked, this object identifier O_ID is written and a call of the VAL function is programmed at a date having the value of the reading date TS to which is added the time delay DT. Otherwise, the programming of the object is already provided.

The annexes A.1.1 and A.1.2 show a computer program excerpt written in computer pseudo-code which may be used in this exemplary embodiment. In particular, annex A.1.2 generically shows a procedure prog_check intended to program a call of the VAL function at a date entered as a parameter ("date_trigger").

Figure 5:
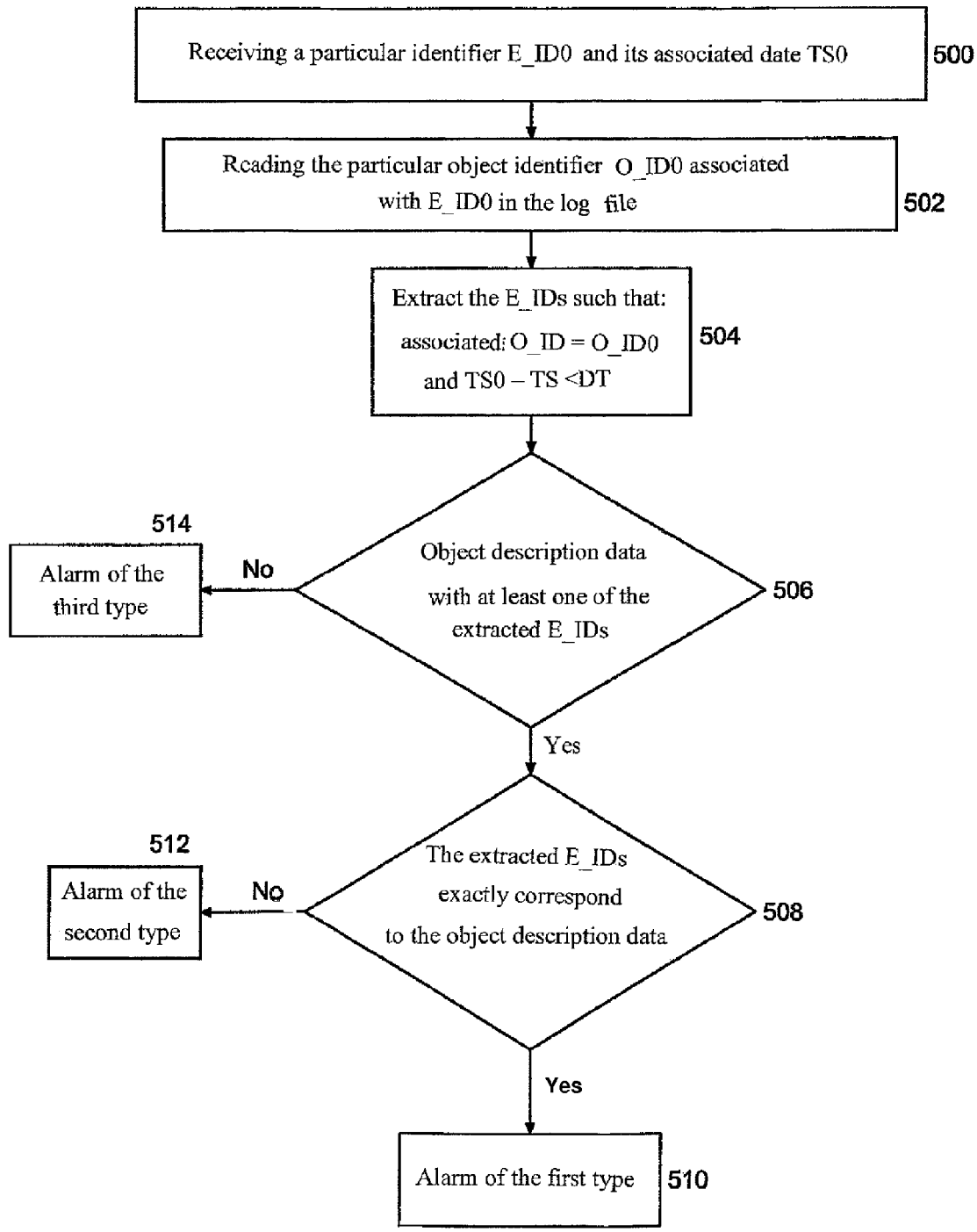
FIG. 5 is a flow chart illustrating the operation of a portion of the controller of FIG. 4.

FIG. 5 illustrates the VAL function in this embodiment. And annex A.1.3 shows as an example a program written in pseudo-code which may be used for applying this VAL function.

In step 500, the VAL function receives a particular individual identifier E_ID, noted as E_ID0, and the reading date TS associated with this particular individual identifier in the log file is noted as TS0.

In step 502, the VAL function reads the particular object identifier O_ID0 associated with the identifier E_ID0 in the log file. This step may in certain alternative embodiments be an option, in particular when the VAL function is called with the particular object identifier O_ID0, or when this identifier is comprised in one way or another in the particular individual identifier E_ID0.

In step 504, the VAL function extracts a subset of the log file consisting of the individual identifiers E_ID associated with the particular object identifier O_ID0 and for which the reading date TS is not very far from the particular reading date TS0 by more than the time delay DT, i.e. such that the period TS0 minus TS is less than DT.

In step 506, the VAL function checks whether the relevant subset contains object description data, for example object cardinal O_NB data.

If so, the VAL function checks whether the individual identifiers E_ID of the subset exactly correspond to the object description data, in step 508. For example, the VAL function makes a count of these individual identifiers E_ID, and then compares this count with the object cardinal O_NB data. Still as an example, the description data comprise a list of individual E_ID identifiers, and then compares this count with object cardinal O_NB data. Still as an example, the description data comprise a list of individual E_ID identifiers and the VAL function compares this list with the individual identifiers of the subset extracted from the log file.

If the result of step 508 is positive, then the VAL function delivers an alarm of a first type, meaning that the aggregated object 1 located by the particular object identifier O_ID0 is entire (Step 510).

If the result of step 508 is negative, then the VAL function delivers an alarm of a second type, meaning that the aggregated object 1 located by the particular object identifier O_ID0 is partly entire. (Step 512). By "partly entire", it is meant that some of the labels 5 making up the aggregated object 1 are absent from the given volume 11 but that the master label is present in this volume.

In the case when the result of step 506 is negative, the VAL function delivers an alert of a third type, meaning that the aggregated object 1 is indefinite. By "indefinite", is meant here that there are not any sufficient description data of the aggregated object 1 in order to allow estimation of its integrity.

This first embodiment of the invention is particularly adapted to the case when the label reader 13 assumes the form of a detection gantry capable of reading the labels 5 which pass through it. Typically a reader of this type reads the labels 5 sequentially.

Such a reader may be positioned at the single inlet/outlet of a given volume 11. In this case the device 9 provides a control of this volume 11.

More generally, such a reader allows an inlet or outlet control of the given volume 11.

The label reader 13 is however not limited to a reader of the gantry type, and may assume other forms such as for example a hand scanner with which the user will read each of a set of labels.

This first embodiment may be simplified in the case when it is certain or at least very likely that the labels read in the given time interval belong to a same aggregated object 1. In this case, the extraction of the individual E_ID identifiers of step 506 is accomplished only according to the reading dates TS. Further, it is not necessary to read the object identifier O_ID during step 504. The organization of the exploitation of device 9 may be such that such a scenario occurs. For example a human agent may make sure that the labels read within the time interval actually belong to a same aggregated object 1.

According to a second embodiment, the LECT function and the label reader 13 are laid out together so as to read labels 5 sequentially and determine a direction of displacement of the label read. For example, the label reader 13 appears as a gantry with at least two antennas, the direction of displacement of a label 5 then being determined by knowing which one of the two antennas has first read the relevant label 5. The label reader 13 may also have a single antenna and be provided with an additional device for detecting the displacement direction, for example of the radar type, capable of establishing whether a label is moving away from or moving closer to it.

For description purposes, it is considered that the label reader 13 and the LECT function are capable here of determining two opposite displacement directions respectively noted as AB and BA.

The recording table here assumes the form of two log files grouping the individual E_ID identifiers of the labels 5 read, the data associated with these individual E_ID identifiers, and the reading dates TS of the labels 5. One of the log files maintains the individual E_ID identifiers of labels 5 read as moving in the direction AB, while the other log file maintains the individual E_ID identifiers of labels 5 read as moving in the BA direction.

Figure 6:
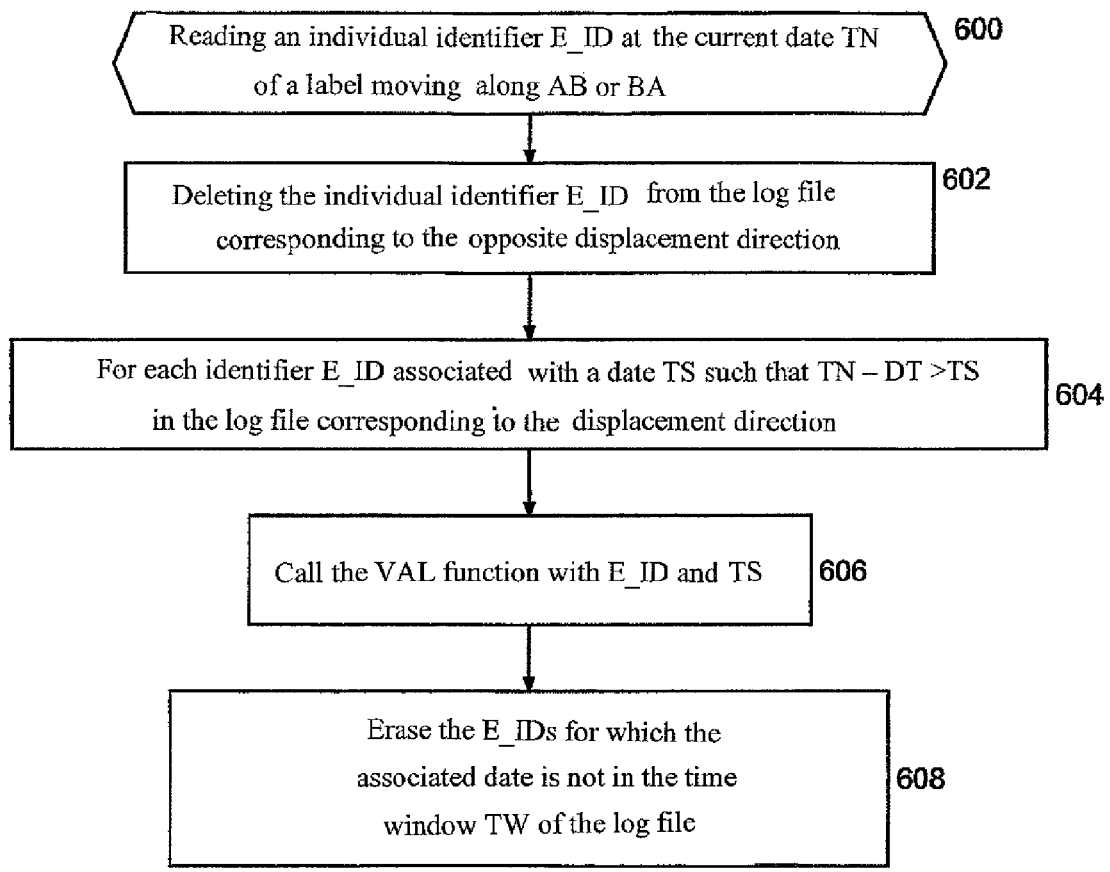
FIG. 6 is analogous to FIG. 4 for a second embodiment of the invention.

FIG. 6 illustrates the operation of the controller 15 in this embodiment. And Annex 2 shows a computer program extract written in computer pseudo-code which may be used for achieving a portion of this controller 15.

In step 600, the LECT function and the label reader 13 co-operate for reading a particular label 5, which moves along one of the directions AB and BA. This particular label 5 is located by means of its individual E_ID identifier. A reading date TS, which has the value of the current date TN, is associated with the individual E_ID identifier in the log file corresponding to the displacement direction of the particular label 5.

In step 602, the controller is laid out so as to delete the individual E_ID identifier of the label 5 read from the log file corresponding to the displacement direction opposite to the direction of displacement of this label, in the case when the relevant log file contains this identifier.

In step 604, the controller 15 is laid out so as to call the VAL function with each of the individual E_ID identifiers contained in the log file corresponding to the displacement direction of the particular label 5, the reading date TS of which is older than the date defined by the present date TN minus the time delay DT.

Optionally, the controller 15 may be laid out so as to suppress from the log file, corresponding to the displacement direction of the particular label 5, the records which are too old. For example, the E_ID identifiers for which the associated reading date TS is older than the set time window value, TW, for the log file are deleted during step 606.

In the second embodiment, the VAL function may be laid out in an analogous way to the VAL function of the first embodiment, except that the integrity of an aggregated object 1 is checked for the log file corresponding to the displacement direction of the particular label 5. In other words, the individual identifiers E_ID extracted in step 504 are extracted from the log file corresponding to the displacement direction of the label 5.

In practice, as for the first embodiment, an additional list may be maintained, which groups the object identifiers, O_IDs, of the aggregated objects 1 for which checking is in progress or is scheduled. Annexes A.2.1, A.2.2 and A.2.3 use such an additional list for each of the displacement directions AB and BA.

In this embodiment, the label reader 13 may be positioned in the unique access to a given volume 11, so as to achieve input/output control of the volume 11.

Figure 7:
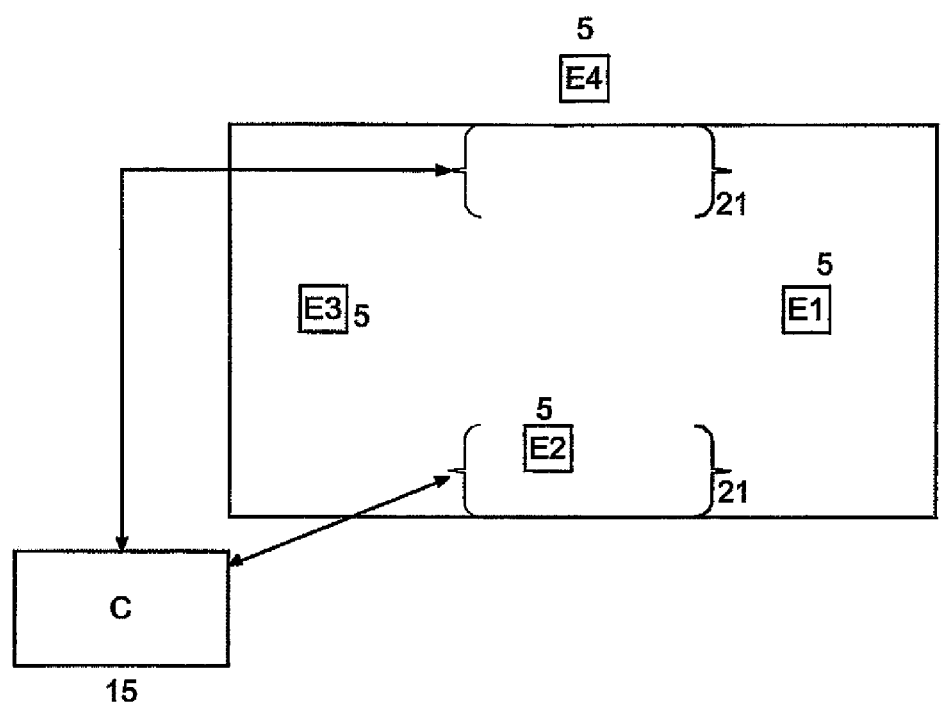
FIG. 7 is a diagram illustrating a particular layout of the device of the invention, used in the embodiment of FIG. 6.

The monitoring device 9 may also comprise several label readers 13 placed in different points of a given volume 11 and connected to a same controller 15. In this case, the different label readers 13 may be positioned in points for physically accessing the volume 11 so as to provide perimetric control on this volume. In FIG. 7, a label reader 13 is positioned in each physical access to the volume 11 so that any label 5 entering or exiting the volume 11 is read. In this case, the label reader 13 advantageously assumes the form of a reading gantry 21, capable of reading labels 5 which appear in front of it. For a dwelling flat for example, a label reader 13 may be positioned in each of the doors opening onto the outside of the flat.

As the monitoring device 9 in this embodiment takes the displacement direction of the labels 5 into account, it may be used in order to monitor a given volume 11 as regards the integrity of one or more aggregated objects 1. In this case the label readers 13 are laid out so that the displacement directions AB and BA correspond to movement for entering the given volume 11 and for exiting the latter, respectively. As the integrity of an aggregated object 1 is checked upon entering into the volume, and upon exiting the latter, this integrity is checked inside the given volume 11, provided that a label reader 13 is positioned in each point for accessing the volume 11.

The monitoring device 9 of the first and second embodiments applies sequential reading of the labels 5. These embodiments are advantageous in that they give the possibility i.a. of achieving control on the entries and exits of a given volume 11. With this, it is possible to monitor the whole of a given volume 11 with low deployment costs: it is sufficient to lay out the reader(s) at each physical access to the volume 11.

By sequentially reading the labels 5, some time freedom may also be kept in monitoring the integrity of an aggregated object 1. Indeed it is not necessary that the whole of the labels 5 forming an aggregated object 1 be simultaneously read in a particular location of the given volume 11. Instead, it is sufficient that the whole of these labels 5 pass through this particular location within a set time interval.

However for certain applications, quasi-simultaneous reading of the whole of the labels 5 present in a given volume 11, may be preferred. This may notably be the case when this given volume 11 has small dimensions, for example when it is desired or when it is possible to restrict the monitoring to such a volume. For example, a monitoring cubicle may be made available, in which a user has a set of labels 5 for checking the integrity of an aggregated object 1 formed by these labels.

When reading the different labels 5 present in a given volume 11 may be set up, the recording table may be made even more simply since it is not necessary to store in memory a reading date.

The controller 15 may be laid out in an analogous way to the first embodiment, except that it is not necessary to take into account the different reading dates TS. This may nevertheless be accomplished as an option.

Figure 8:
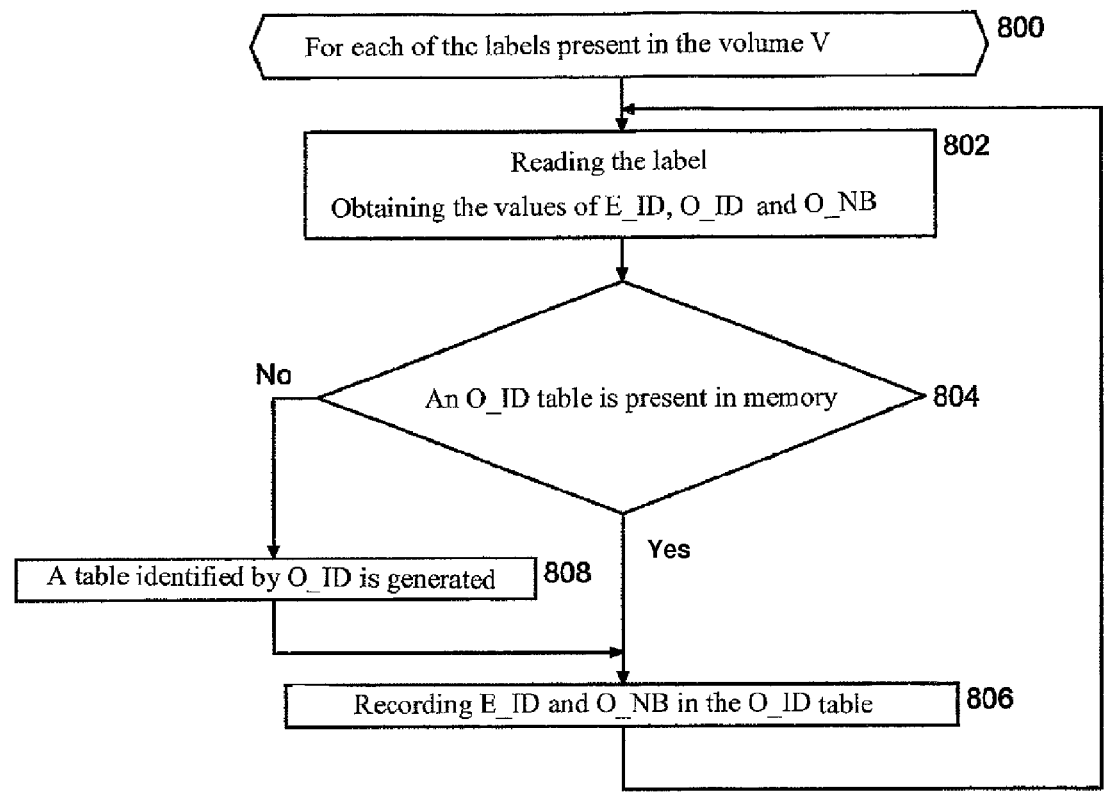
FIG. 8 is a flow chart illustrating the operation of a portion of the controller in a third embodiment of the invention.

FIG. 8 illustrates another alternative embodiment of the LECT function in the case of bulk reading of the labels 5.

In step 800, the LECT function resets a loop which bears upon the whole of the labels 5 located within the range of the label reader 13.

In step 802, the LECT function co-operates with this label reader 13 for acquiring the data stored in memory in the label 5 being read. The LECT function is capable of distinguishing among these received data, an individual identifier E_ID, an object identifier O_ID, and, if necessary an object cardinal O_NB, and more generally individual identification, object description data and if necessary object appurtenance data.

In step 804, the LECT function co-operates with the memory of the controller 15 in order to write a recording table grouping the acquired data in an orderly way. For example, the recording table assumes the form of a table with one entry, the latter grouping the individual identifiers of the labels read. Each datum in a label 5 associated with an individual E_ID identifier is further stored in memory into the table, opposite to the relevant individual identifier.

In practice, such an object table may be identified on the basis of the value of the object identification O_ID data.

If this is the case, the LECT function then fills the table with the value of the individual identifier E_ID comprised in data received in step 802 (step 806). In the case when these data contain an object cardinal O_NB, the value of the latter is also stored in the table. More generally, the object description data are also stored in memory in this object table.

If the value of the E_ID identifier already exists in the table of the O_ID object, the LECT function is again started in step 802 without any additional writing into this table.

If the test of step 804 is negative, the LECT function is then capable of co-operating with the memory of the controller 15 in order to generate a recording table identified on the basis of object identification O_ID data, during step 808, and continues with step 806.

At the end of step 806, the LECT function is re-executed from step 802 for reading a new label 5.

The execution of the LECT function may begin by an operation for suppressing the whole of the object tables from the memory of the controller 15, so that the state of the memory always corresponds to the labels 5 present within the range of the label reader(s) 13 upon executing this LECT function.

Figure 9:
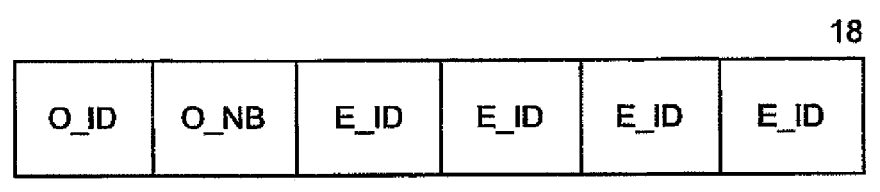

FIG. 9 schematically shows a recording table 17 for a value of the object identifier O_ID. This table 17 maintains a relationship between a value of an object identifier O_ID, a value of an object cardinal O_NB and individual identifier values of labels 5.

Figure 10:
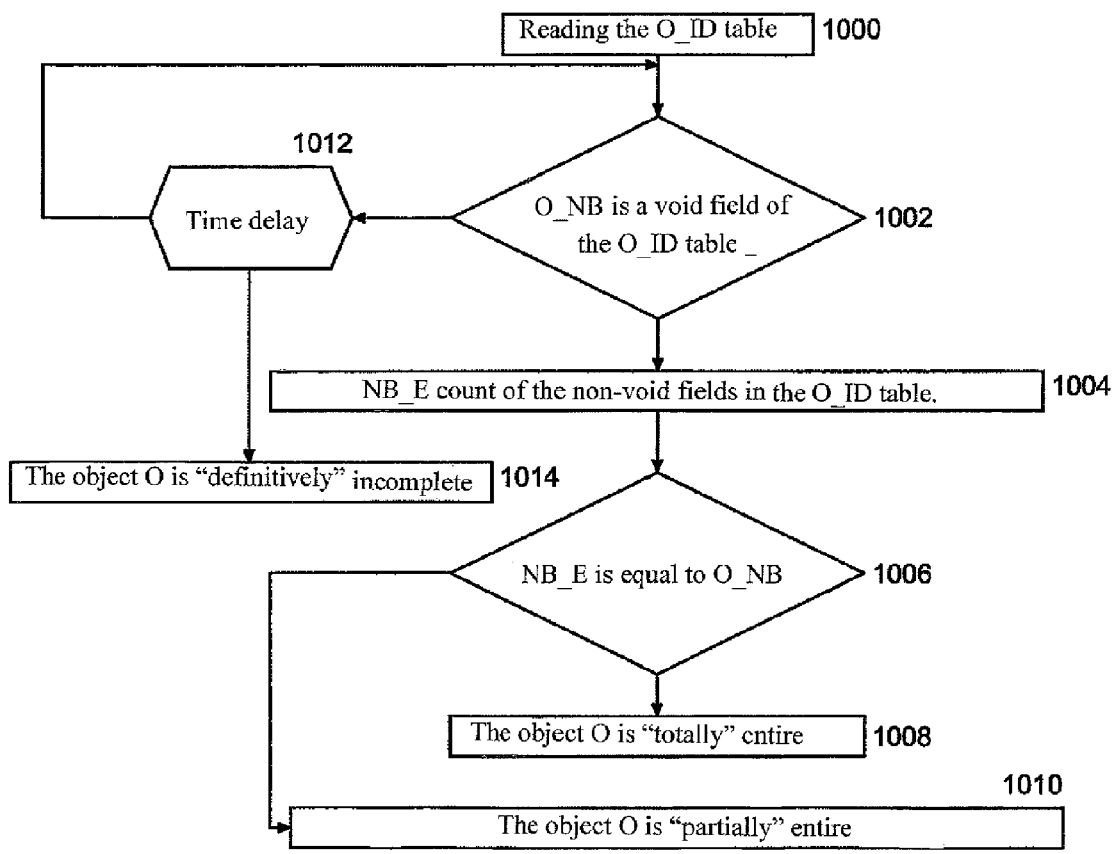
FIG. 10 is a flow chart illustrating the operation of a portion of the controller in the third embodiment of the invention.

FIG. 10 illustrates an alternative embodiment of the VAL function in the case when the bulk reading of the labels 15 may be applied.

In step 1000, the VAL function carries out reading of the recording table associated with a particular object O_ID.

In step 1002, the VAL function checks whether a recording exists corresponding to the cardinal of the object O_NB.

If so, then the VAL function makes a count NB_E of non-void recordings corresponding to values of individual identifiers E_ID (step 1004).

In step 1006, the VAL function checks whether the count NB_E is equal to the value of the object cardinal O_NB.

If so, the VAL function then delivers an alarm of the first type indicating an entire object (step 1008).

If the test of step 1006 is negative, then the VAL function delivers an alarm of the second type indicating partial integrity (step 1010).

If the test of step 1002 is negative, then the VAL function applies a time delay step 1012.

In the case when the test of step 1002 is again negative, the VAL function returns an alarm of the third type indicating an indefinite aggregated object.

The controller 15 is advantageously laid out so as to regularly execute the VAL function.

The label reader(s) 13 are preferably distributed so that any label 5 present inside the volume 11 is read.

The label reader(s) 13 may be distributed so as to cover the whole of the volume 11. In this case, each of the label reader(s) 13 may assume the shape of a multidirectional antenna as illustrated in FIG. 1.

Figure 11:
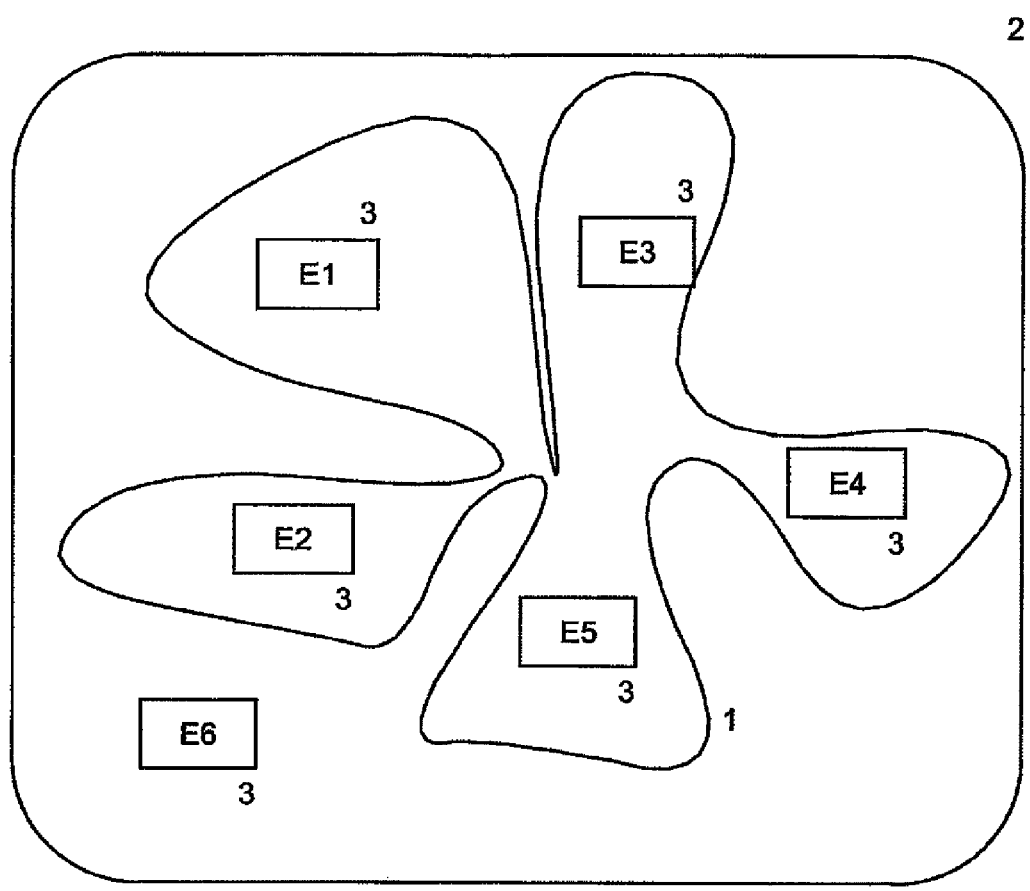
FIG. 11 is a diagram showing several aggregated objects.

FIG. 11 shows a development of the invention.

The aggregated object 1 or first aggregated object 1, consists of elementary objects E1, E2, E3, E4 and E5, while a second aggregated object 2 consists of each of the elementary objects E1 to E6. In other words, the second aggregated object 2 consists of the first aggregated object 1 and of the elementary object E6.

Each of the elementary objects E1 to E6 assume the form of an alternative of the label 5, designated as label 5A. Each of the constitutive labels 5A of the first aggregated object 1 or of the second aggregated object 2 maintains in memory identification data which are specific to it, for example elementary identifier E_ID data.

First aggregated object 1 description data are stored in memory in at least some of the labels 5A corresponding to the elementary objects E1 to E5. Second aggregated object 2 description data are stored in memory in at least some of the labels 5A corresponding to the elementary objects E1 to E6. The integrity of each of the first aggregated object 1 and second aggregated object 2 may thus be checked from respective description data and from data of individual identifiers of the labels 5A.

For example, each of the labels E1 to E5 maintains first object identification data O1_ID and second object identifier O2_ID data. And the label E6 only maintains second object identifier O2_ID data. The first object identification data O1_ID comprise a description of this first aggregated object 1, for example as an imprint of this object. The second object identification O2_ID data comprise a description of this second aggregated object 2, for example as an imprint of this object.

Annex A3 shows an algorithm written in pseudo-code, intended to check the integrity of the first aggregated object 1 and of the second aggregated object 2. This algorithm, which is only described as an example, assumes that each of the labels 5A making up both the first aggregated object 1 and the second aggregated object 2 maintains first object identifier O1_ID data and second object identification O2_ID data.

The code "gid" designates the imprint of the first aggregated object 1, while the code "gid2" designates the imprint of the second aggregated object 2. The algorithm of annex 3 differs from that of annex 1 by the procedure for checking integrity of an aggregated object, i.e. by programming the procedure "check" described in A.3.3. The checked object is the object "id0.gid", which may either be the first aggregated object 1 or the second aggregated object 2. Checking the integrity of the first aggregated object 1 is performed by forming an object "group" grouping the identifiers, "id", the first object identification data "id.gid" of which match. Checking the integrity of the second aggregated object 2 is performed by checking the integrity of the first aggregated object 1 and by adding to the "group" of the first aggregated object 1 the identifiers "id", the second aggregated object 2 identification data of which, "id.gid2", match. In other words, the algorithm of the annex 3 takes advantage of the inclusion of the first aggregated object 1 in the second aggregated object 2 in order to simplify the checking process.

Figure 12:
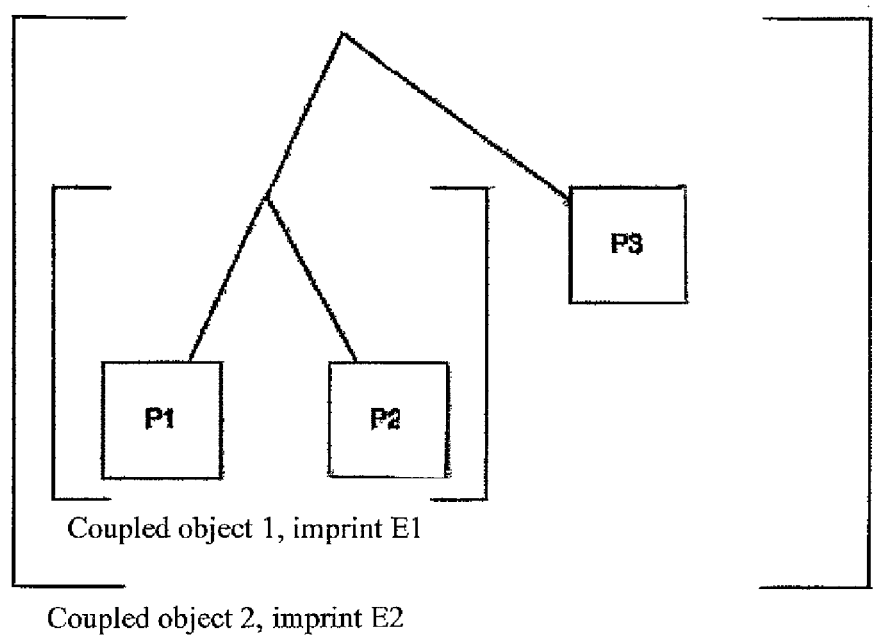
FIG. 12 is a diagram illustrating a development of the invention with several aggregated objects.

As illustrated in FIG. 12, an aggregated object may more generally include one or several different aggregated objects. It is sufficient that at each time at least one of the labels forming an aggregated object maintains the description data of this object. Thus it is possible to generate a tree structure of aggregated objects. For example, these object identification data may be stored in each of the labels making up a particular aggregated object, as an imprint of this object.

For example, the second aggregated object 2 consists of the physical object P3 and of the first aggregated object 1, which itself consists of the physical objects P1 and P2.

The first aggregated object 1 may be defined by object description data. For example, these data may assume the form of a first object identifier O1_ID as an imprint or first imprint, i.e. data describing the composition of the first aggregated object 1. This first object identifier O1_ID may be stored in each of the constitutive labels of the first aggregated object 1 or only in some of them.

This imprint may simply result from the concatenation of elementary identifier E_ID data of each of the constitutive labels of the first aggregated object 1. In more elaborate embodiments, the first imprint may result from the application of a hash function to the whole of these data of elementary identifiers E_ID.

Also, the second aggregated object 2 may be defined by object description data which may assume the form of a second object identifier O2_ID achieved as a second imprint E2 of this object.

For example, each of the labels 5A to be affixed on the physical object P1 and on the physical object P2 contains the first imprint E1, or primary imprint, or the second imprint E2, or secondary imprint.

More generally, a primary imprint will correspond to the imprint of the aggregated object of higher level, or level N, in the tree, while the second imprint will correspond to the imprint of the aggregated object of level N minus 1 to which belongs the physical object on which the label will be affixed. This implies that the secondary imprint of the labels 5A intended for physical objects at the root of the tree will be void or zero.

The integrity of the first aggregated object 1 and of the second aggregated object 2 may be tested by performing two checking processes, on one and on the other of the first aggregated object 1 and the second aggregated object 2.

The inclusion of an aggregated object in another is very interesting in that it allows a tree structure to be generated. However, this is a particular embodiment, and other mutual layouts of aggregated objects may be applied, depending on the contemplated application.

For example, the first aggregated object 1 and the second aggregated object 2 may be partly put together. The second aggregated object 2 may thus only comprise the labels E2, E5 and E6.

Annex A4 shows an algorithm, written in pseudo-code, intended to check the integrity of a first aggregated object 1 and of a second aggregated object 2, in the case when the first aggregated object 1 is not totally included in the aggregated object 2. The algorithm of this annex 4 assumes that each of the labels 5A comprised at the same time in the first aggregated object 1 and the second aggregated object 2 maintains a first aggregated object identifier O1_ID, designated as "gid" in this annex, and a second aggregated object identifier O2_ID, designated as "gid2". This algorithm takes into account a maximum waiting period, designated as "delta_trans", so that the whole of the constitutive labels 5A of an aggregated object "i.e. this object can only be entire if the whole of its labels are read within this period" are read. This is only an option, and as seen above, this additional integrity condition may be omitted, in particular when bulk reading of the labels is applied.

Unlike the algorithm of annex 3, the algorithm of annex 4 cannot take advantage of the inclusion of the first aggregated object 1 in the second aggregated object 2. In A.4.3, a group "Group" consisting of the identifiers for which the first object identifier data "id.gid" or the second object identifier data "id.gd2" correspond to the identifier of the checked object, i.e. "id0.gid", is therefore generated. The procedure "Check Group" is then called in order to check the agreement of this group with the description data of the checked object (A.4.4.).

Figure 13:
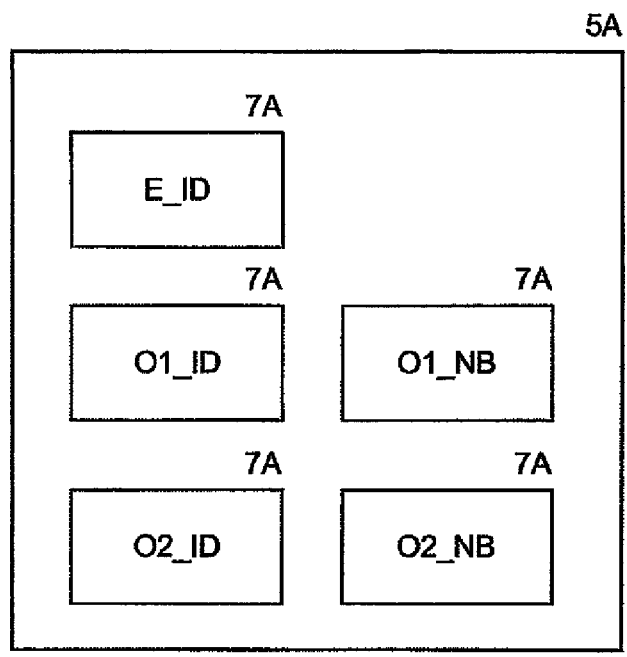
FIG. 13 is a diagram illustrating an alternative label for aggregated objects of FIG. 11.

FIG. 13 illustrates an exemplary label 5A as an alternative of label 5.

Each label 5A maintains in one or several memory areas 7A, data of an elementary identifier E_ID, specific to the relevant label 5A, identifier data of a first aggregated object O1_ID, common to the whole of the constitutive labels 5A of the aggregated object 1. Optionally, each label 5A further maintains in these memory areas 7A, first object cardinal O1_NB data, indicating the number of constitutive labels 5A of the aggregated object 1.

In these memory areas 7A, or in additional memory areas, the label 5A further maintains second object identifier data O2_ID, common to each of the constitutive labels 5A of a second aggregated object 2. Optionally, second object cardinal O2_NB data, indicating the number of constitutive labels 5A of this second aggregated object 2 are also maintained in these memory areas 7A.

The first object cardinal data O1_NB and second object cardinal data O2_NB are optional. The first object O1_ID and second object O2_ID identifier data may implicitly or explicitly comprise a description of the first 1 and second 2 aggregated objects per se. This is notably the case when these data assume the form of imprints, as seen above.

For example, the first object O1_ID identifier data may consist in the result of a hash function generated from elementary identifier E_ID data of each of the constitutive labels of the first aggregated object 1. Also, as an addition and/or as a replacement, the second object O2_ID identifier data may consist in the result of a hash function generated from elementary identifier E_ID data of each of the constitutive labels of the second aggregated object 2.

In an advantageous alternative, the second object identifier O2_ID data may comprise the result of a hash function generated from first object identifier O1_ID data and from elementary identifier E_ID data of each of the elementary labels belonging to the second aggregated object 2 and not belonging to the first aggregated object 1.

In a particularly advantageous alternative, the object identifier data O_ID consist of the result of a hash function generated from elementary identifier E_ID data of each of the labels making up the aggregated object 1 and from a datum of the public key type PUB_ID, or the like. In this embodiment, the integrity of the aggregated object 1 can only be checked if consistent private key PVT_ID data, public key data are available to the function VAL.

In other words, the public key PUB_ID data are only used for generating object identifier O_ID data, while private key PVT_ID data are used for checking the integrity of the aggregated object 1.

The public key PUB_ID data may be integrated into the CREATION function described above for generating object identifier O_ID data. With this, it is possible to write into the labels 5A easily, in one of the ways described above.

Alternatively, the public key PUB_ID data may be maintained in a label 5A as elementary identifier E_ID data of this label. The CREATION function may thus be called with this particular label, as an addition to the other constitutive labels 5A of the aggregated object 1. This has the advantage that the same CREATION function may be used, regardless of whether public key PUB_ID data are used or not.

In still another alternative, the public key PUB_ID data may be entered for use by the CREATION function. This has the advantage that the same function may be used with several different public key PUB_ID data, i.e. for generating several different aggregated objects, without having to re-write this function and without having to use a label for storing these public key data. These public key PUB_ID data may further be acquired through other means, such as by reading a bar code, producing an image followed by character recognition, receiving a message, or other means.

These public key PUB_ID data may be seen as identifying a proxy, in the sense that these data replace the elementary identifier E_ID data of a constitutive label of the aggregated object during the generation of labels. In other words, this allows writing of the labels of the aggregated object although a label is absent.

The private key PVT_ID data may be stored in memory in label 5 as elementary identifier E_ID data relating to this particular label.

Alternatively, the private key PVT_ID data may be integrated to the checking function. In this case, the use of data of the public key and private key type gives the possibility of especially preventing checking of the integrity of the object by a function other than the one which integrates the private key PVT_ID data.

In still another alternative, the private key PVT_ID data may be entered or obtained by different means, such as reading a bar code, reading a magnetic medium, reading a chip card, receiving a message, reading a finger print and querying a remote server, or other means.

Figure 14:
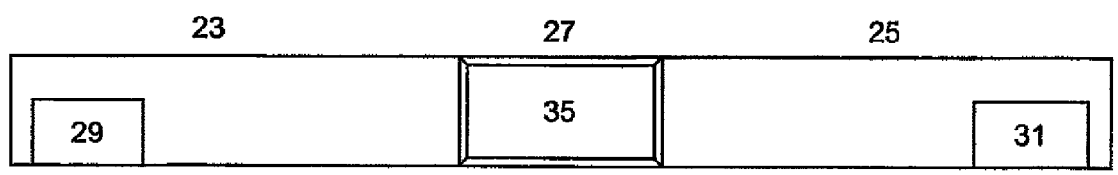
FIG. 14 is a diagram illustrating a first application of the device according to the invention.

FIG. 14 illustrates a first exemplary application of the monitoring device 1.

A first railway wagon 23 and a second railway wagon 25 are connected together through a communications airlock 27.

The first wagon 23 has an outer access door in which a dual antenna label reader is positioned, controlling the access to a first space to be monitored 29, while the second wagon 25 has an analogous door, also equipped with a dual antenna reader for controlling access to a second space to be monitored 31.

A third space to be monitored 33 may optionally be associated with the air lock 27 for which each of the accesses to the first wagon 23 and second wagon 25 is provided with a dual antenna label reader.

A traveler bears a label 5 of the master type. Each of his/her luggage is provided with a label 5. The master label 5 and the whole of the labels 5 borne by the luggage have been programmed so as to make up a same aggregated object 1.

In order to access the first wagon 23, the traveler penetrates into the first space to be monitored 29. By doing this, the label 5 which he/she bears, as well as the whole of the labels 5 borne by the luggage, which penetrate into the first space 29, are read by co-operation of the dual antennae reader and the LECT function. The VAL function is called, for example consecutively to each label reading or in a programmed way from the reading of the first label.

If the VAL function returns an indication of a partly entire object, the alarm of the second type may be laid out so as to indicate to the traveler the absence of one of his/her pieces of luggage. This alarm may also be inhibited, for example by considering that the integrity of the aggregated object 1 formed with the traveler and his/her luggage does not have to be checked in the direction of getting aboard the train. For this application, the time delay DT is advantageously set so that the whole of the luggage of the traveler may be put on board by several persons accessing the train in a practically successive way. In other words, the time delay DT may be set so that a first portion of the luggage is introduced on board by the traveler himself/herself while a second portion is introduced by a person accompanying the relevant traveler, such as a porter for example. The time delay DT may thus be set to a period of a few tens of seconds for example.

If the VAL function returns an indication of an indefinite object, the alarm of the third type may be laid out so as to trigger an alarm. Indeed, this means that a piece of luggage is introduced into the train without being accompanied by its traveler-owner. This may occur when the traveler carries a piece of luggage which he/she wrongly believes that it is his/her own, or further when the person carrying the relevant piece of luggage has stolen this piece of luggage from a third party.

If the VAL function indicates an entire object, then the alarm of the first type may be laid out so as to indicate to the traveler that the whole of his/her luggage has actually been loaded on board, for example by switching on a color indicator light. Optionally, the alarm of the first type may be processed by a door opening/closing control system for only allowing access to the compartment when an entire object has been detected.

When the traveler, or one of his/her pieces of luggage leaves the wagon 23 through the space 29, the label 5 which it bears is again read, and the VAL function is executed.

In the case when this VAL function returns an indication of an entire object, the alarm of the first type may be laid out so as to indicate to the traveler that the latter is actually provided with the whole of his/her luggage. Optionally, physical exit from the space 29 may be prohibited if an entire aggregated object 1 is not exhibited.

In the case when the VAL function returns an indication of a partly entire object, the alarm of the second type may be laid out so as to indicate to the traveler that one piece of his/her luggage is missing. This may be achieved by any indication means, such as switching on a light of a particular color, or further by activating a sound signal.

In the case when the VAL function returns an indication of an indefinite object, the alarm of the third type may be laid out so as to warn any present person that the person who attempts to take out a piece of luggage is not the traveler-owner associated with said piece of luggage. With this, theft may be avoided, but also in versions of physically identical pieces of luggage.

In an advantageous alternative embodiment, the alarm of the third type may assume the form of a signal specifically intended for the owner of the luggage, for example a message sent to his/her mobile telephone. The whole of the labels used, or at least one of them, then stores in memory a personal piece of information relating to said owner, such as a mobile telephone number.

More generally, any label may maintain a piece of information intended to be specifically used for transmitting at least one of the alarm types, in particular a piece of destination information for this alarm.

The second space 31 may be monitored in a similar way to the first space 29.

The third space 35 may also be monitored in an analogous way to the first 29 and second 31 spaces in order to avoid that a piece of luggage is moved from one wagon to the other without its traveler-owner. In this case, the alarm of the second type transmitted when a partly entire object is detected, may be inhibited, which allows the traveler to move within the train with only part of his/her luggage.

Since dual antenna label readers 13 are used here, it is possible to process the alarms controlled by the VAL function in a different way depending on whether this is upon getting on board the train or getting off the latter. For example, a choice may be made to allow a piece of luggage without its traveler-owner to be introduced into the train but to transmit an alarm when this piece of luggage is unloaded without its owner. The opposite configuration may also be applied, in particular when it is desirable to monitor the introduction of a piece of luggage without its owner, as this is the case regarding fighting against terrorism.

The time delay DT is advantageously adjusted so that the triggering of the alarms is sufficiently fast so that adequate steps may be taken while avoiding indiscriminate triggering due to the introduction of luggage of a same aggregated object 1 by several persons of a same group.

Figure 15:
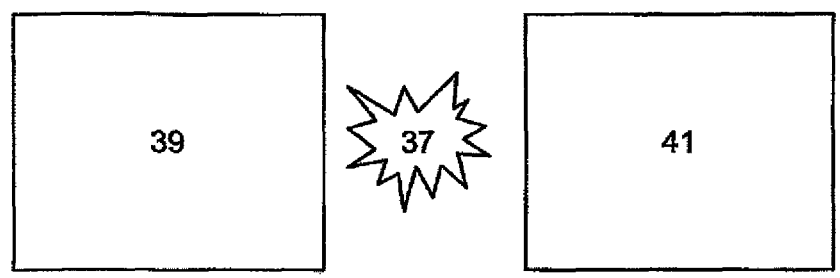
FIG. 15 is a diagram illustrating a second application of the device according to the invention.

FIG. 15 illustrates a second exemplary application of the monitoring device 1.

In an air terminal, an area for controlling luggage 37, conventionally via x-rays, is preceded with a pre-control space 39 and a post-control space 41.

A traveler provided with a label 5 is accompanied by his/her labeled luggage in the pre-control space 39.

The CREATION function is called in order to write at least object identifier O_ID data in each of the labels 5 and object cardinal O_NB data in at least one of these labels in order to generate an aggregated object 1. The pre-control space 39 may assume the form of a cabin, the walls of which are impervious to radio waves.

The post-control space 41 is monitored by means of the device 1. For example, a label reader 13 is laid out in this space 41 so that crossing of the space 41 by a label 5 implies the reading of this label. This may be achieved by means of a label reader 13 laid out as a gantry or a reader with a bidirectional antenna capable of carrying out "bulk" reading of the space 41.

The VAL function is executed, for example consecutively to each label reading, or in a programmed way from reading a first label of an aggregated object 1.

If the VAL function indicates an incomplete object, the alarm of the second type may be laid out so as to inform the traveler that one of his/her pieces of luggage is missing.

If the VAL function indicates an indefinite object, the alarm of the third type may be laid out so as to indicate that the person is provided with a piece of luggage which does not belong to him/her. With this, it is notably possible to identify substitutions of pieces of luggage between two different owners.

Optionally, the exiting from the post-control space 41 may be conditioned to the transmission of an alarm of the first type indicating an entire aggregated object 1. In other words, it may be ensured that the traveler is only allowed to leave this area if he/she is provided with the whole of his/her luggage.

Exiting from the post-control space 41 may also be monitored so that a third person does not leave this control area together with a piece of luggage of the person presently being monitored. Label readers 13 of the gantry type may then be positioned in each physical exit point from this post-control space 41.

Figure 16:
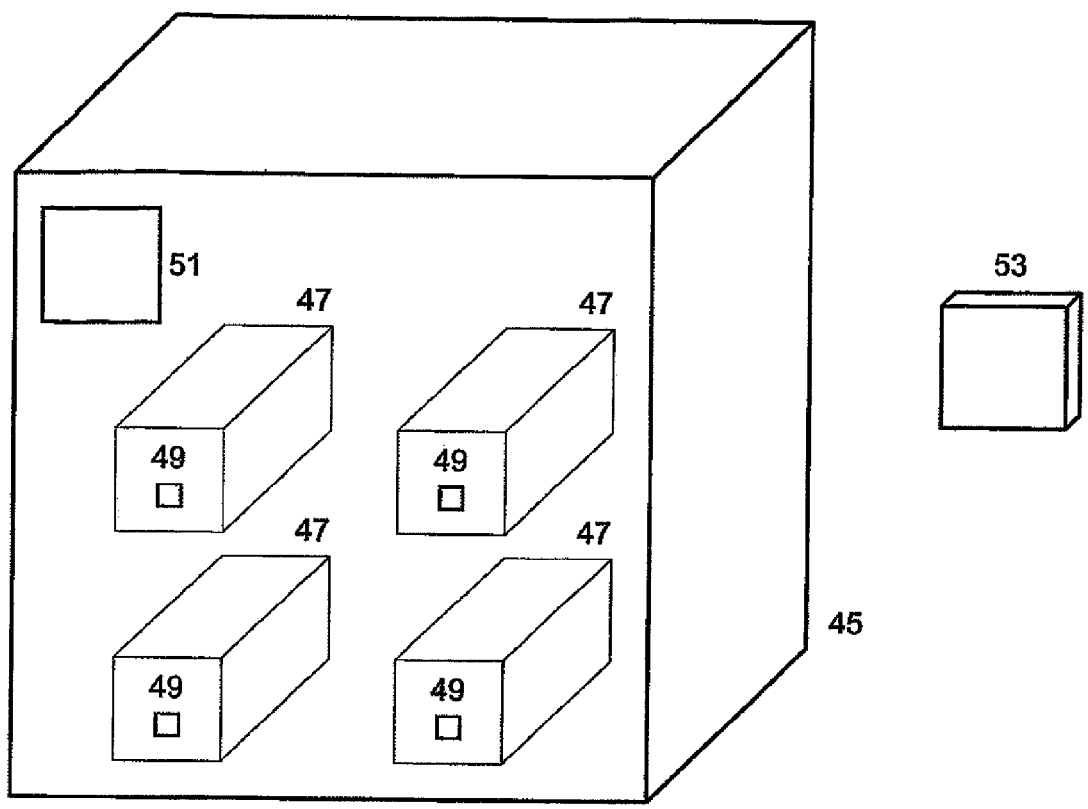
FIG. 16 is a diagram illustrating a third application of the device according to the invention.

FIG. 16 illustrates a third application of the monitoring device 1 according to the invention.

A packet 45 to be forwarded to an consignee comprises a plurality of physical objects 47. Each of the physical objects 47 bears a radio frequency label, or an object label 49. The packet 45 also bears a radio frequency label or packet label 51. The set formed by the packet 45 and the physical object 47 forms a first aggregated object.

Each of the object labels 49 maintains elementary identifier E_ID data which are specific to it. The object labels 49 may be pre-programmed with unique elementary identifier E_ID data. In this case, no particular programming is required for these object labels 49, which may be used as produced from the factory.

The packet label 51 maintains elementary identifier E_ID data which are specific to it, as well as first coupled object identifier data O1_ID established on the basis of the elementary identifier E_ID data of each of the object labels 49 and of the elementary identifier E_ID data of the packet label 51.

The first object identifier O1_ID data advantageously assume the form of an imprint of the first object O1_ID. In this case, it is unnecessary that the packet label 51 further maintains first object cardinal NB1_ID data.

Advantageously, the imprint E1 of the first aggregated object assumes the form of the result of a hash function applied to the whole of the elementary identifier E_ID data of the object labels 49 and of the packet label 51.

This programming of the packet label 51 is typically accomplished by the dispatcher of the packet 45, or by the carrier who deals with this packet 45.

A second coupled object consists of each of the physical objects 47, of the packet 45 and of the consignee of the packet 51.

The packet label 51 further maintains second object identification O2_ID data established on the basis of individual E_ID identifiers of the object labels 49, of the packet label 51 and of an additional label or consignee label 53.

Preferably, these second object identification data O2_ID assume the form of an imprint E2.

Advantageously, the second object description data O2_ID are produced from a hash function applied to each of the elementary identifier E_ID data of the object labels 49, elementary identifier E_ID data of the packet label 51 and of a public key PUB_ID which is consistent with private key PVT_ID data stored in the memory of the consignee label 53 as elementary identifier E_ID data.

The integrity of the first aggregated object may be checked by the compliance of the elementary identifiers E_ID of the object labels 49 and of the packet label 51 with description data of the first object O1_ID stored in the packet label 51. This check does not require any of the data stored in the consignee label 53 and may therefore be performed in the absence of the consignee label 53.

The integrity of the first aggregated object 1 may be checked throughout the course of the packet 45 by the carrier(s).

The checking of the integrity of the first aggregated object 1 may be accomplished with any of the embodiments of the monitoring device 1. Reading through a gantry without handling the reading delay or bulk reading may be preferred here, given that the whole of the labels to be checked is quasi certainly located in a same space, i.e. the packet 45.

The integrity of the second aggregated object may be checked by the compliance of the individual identifiers E_ID of the object labels 49, of the packet label 51 and of the consignee label 53 with the description data of the second object O2_ID.

The integrity of the second aggregated object can only be checked in the presence of the consignee label 53.

Preferably, this integrity is checked upon handing over the packet 45 to its consignee. The dispatcher thereby makes sure that the packet 45 is handed over to the correct consignee, while the latter may check the integrity of the packet 45 which he/she receives, without opening the latter, before accepting delivery.

The consignee is thereby aware that the packet 45 which he/she receives is identical with the shipped contents. This is interesting since the transfer of responsibility is generally accomplished upon delivery by the carrier conveyor to the consignee, who accepts this responsibility by being aware here that his/her packet is complete.

There again, several of the embodiments of the monitoring device 9 may be used. For example, bulk reading of the labels may be preferred as regards the packet, while reading with a hand scanner may be used together in order to read the label of the consignee.

The packet label 51 may assume a shape similar to that of a postage stamp, i.e. it may be visually impossible to forge and subject to paying postage costs. Complementarily or additionally it may be laid out so as to break if an attempt is made to detach it, for example by the use of a suitable adhesive or an irreversible packet bonding system.

The application which has just been described may be extended to any postal mail, the contents of which, typically an envelope, bears a label 5A and the contents, typically a letter, bears a label 5.

Figure 17:
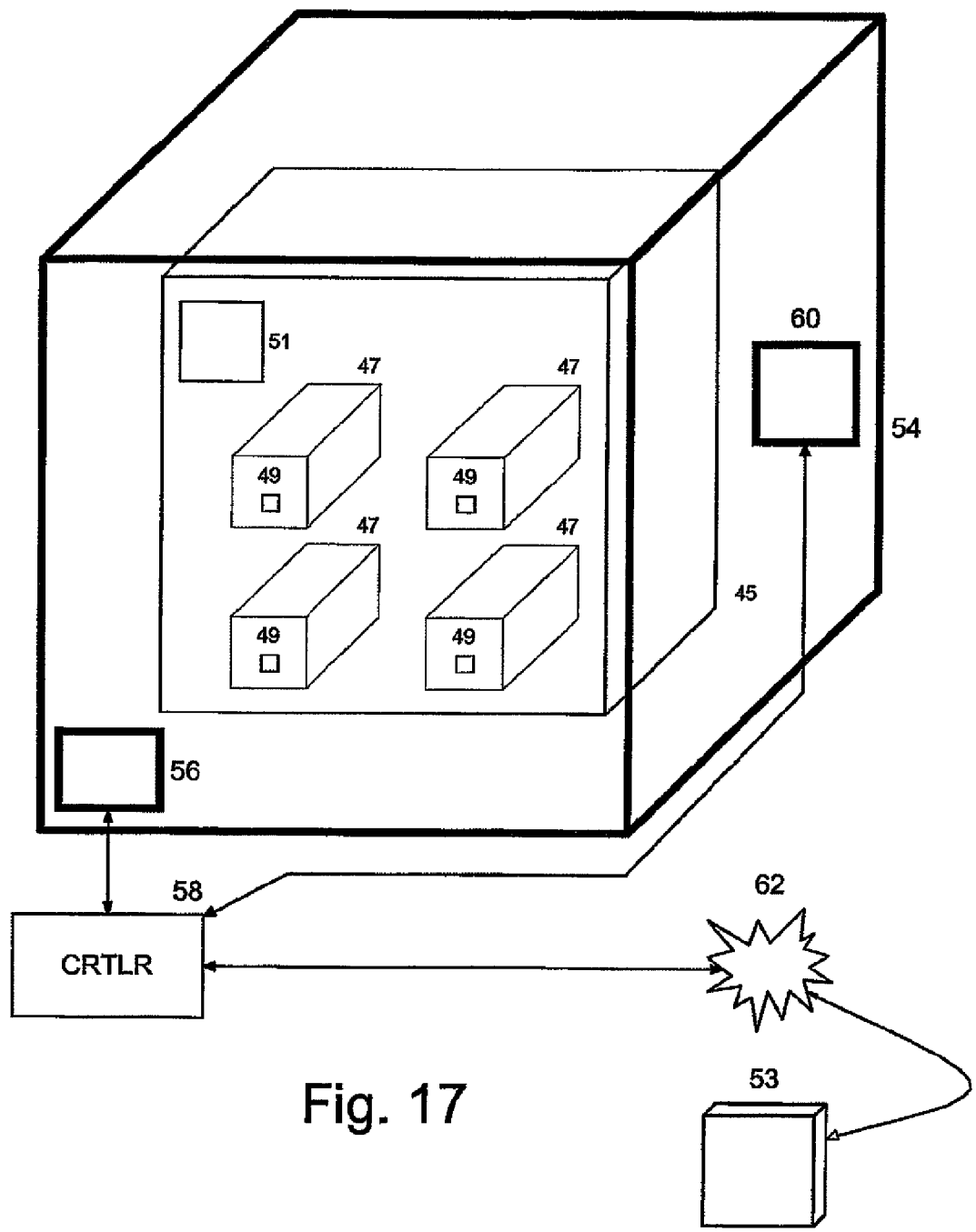
FIG. 17 is a diagram illustrating a fourth application of the device according to the invention as a development of the third application.

FIG. 17 illustrates a development of the application of FIG. 16.

Left-luggage lockers 54 are provided with an electronic opening system 56, controlled by a controller 58. The controller 58 is connected to a device for reading radio frequency labels 60 arranged so as to read the whole of the labels inside the left-luggage lockers 54.

Figure 18:
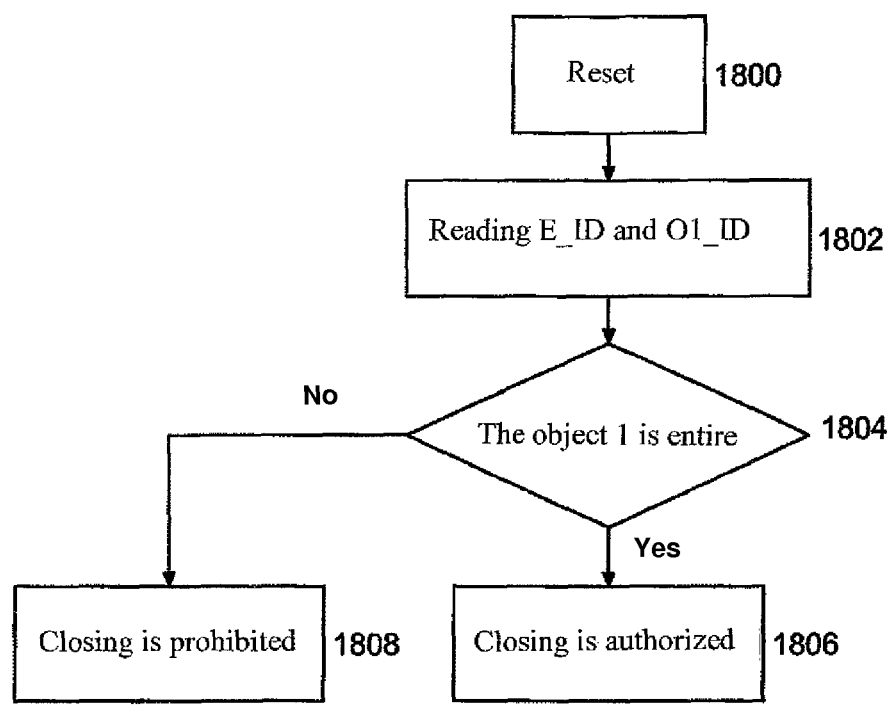
FIGS. 18 and 19 are flow charts illustrating the operation of a controller used for the fourth application of the invention.

FIG. 18 illustrates the operation of the controller 58 for depositing the packet 45.

In step 1800, the controller interacts with the opening device 56 in order to check that the left-luggage lockers 54 are open. This also corresponds to a step resetting the controller 58.

In step 1802, the controller 58 interacts with the reading device 60 in order to acquire elementary identifier E_ID data of the labels placed inside the left-luggage lockers 54, as well as the first object identifier O1_ID data.

In step 1804, the controller 58 calls a function for checking integrity for the first object. This function checks the consistency of the elementary identifier E_ID data read and the first object identifier O1_ID data.

If there is consistency, i.e. if the labels positioned inside the left-luggage lockers 54 form an entire coupled object, then the closing of the door is controlled in step 1806.

Otherwise closing is prohibited, in step 1808.

Although this is not illustrated in FIG. 18, the closing of the left-luggage lockers are also prohibited in the absence of first object identifier O1_ID data. This corresponds to the case when the packet label 51 was not able to be read, which notably occurs when the latter is deteriorated or absent.

Figure 19:
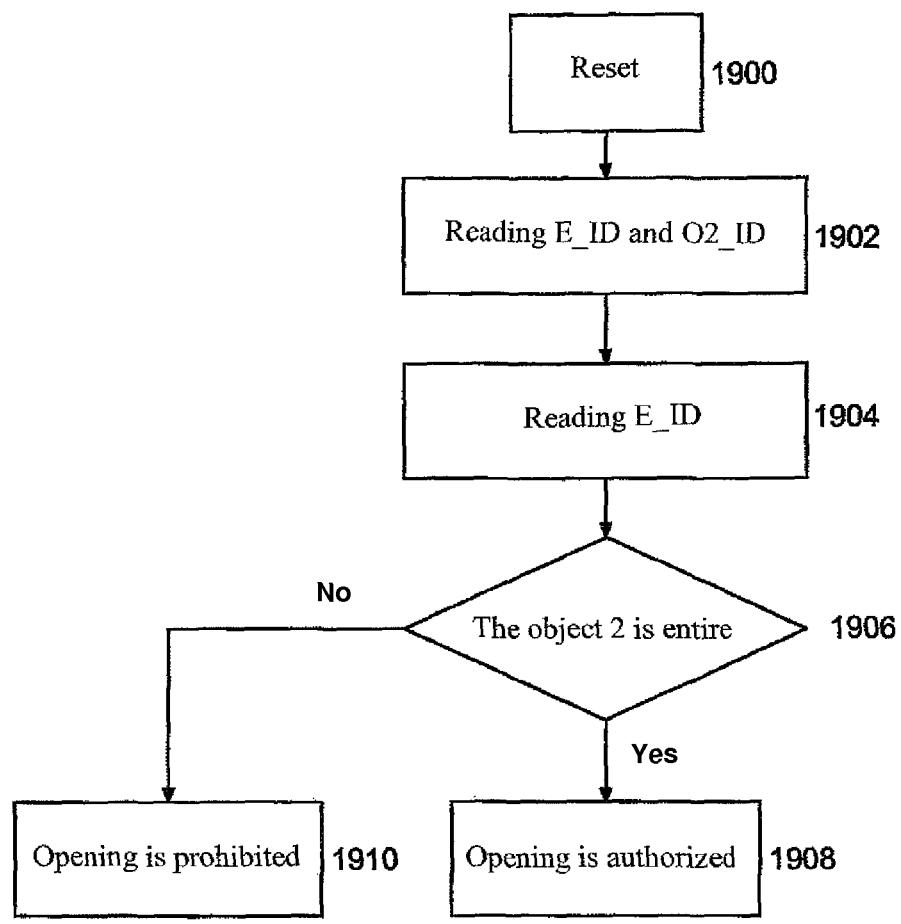

FIG. 19 illustrates the operation of the controller 58 for withdrawing the packet 45.

In step 1900, the controller 58 is reset.

In step 1902, the controller 58 interacts with the reading device 60 in order to acquire elementary identifier E_ID data of the labels placed inside the left-luggage lockers 54, as well as the second object identifier data O2_ID.

In step 1904, the controller 58 interacts with a radiofrequency label reader 62, possibly a remote reader, in order to acquire from the consignee label 53 the elementary identifier E_ID data specific to this label.

In step 1906, the controller 58 calls a function for checking integrity for the second aggregated object.

If the data of elementary identifiers E_ID form a second coupled entire object, then opening of the door is controlled, in step 1908. Otherwise the door remains closed.

In a development of this application, several left-luggage lockers 54 may be laid out in proximity to each other. The controller 58 may in this case be common to the whole of these left-luggage lockers and maintain a table for allocation of the left-luggage lockers 54. This allocation table maintains a link between a left-luggage locker address datum, a status datum of this left-luggage locker capable of assuming the values of free or occupied, and a signature datum of the packet 45 housed inside the relevant left-luggage locker.

When a packet 45 has to be deposited in a locker, a "new deposit" order is given to the controller. This order may be automatically triggered upon the occurrence of an event such as the detection of the presence of a packet by a photosensitive cell, the reading of the labels by a gantry, possibly connected to the controller 58, or other means or upon a command from the user.

The controller 58 calls a function for selecting a luggage locker, capable of querying the allocation table in order to find the address of a locker therein for which the status is "free". Preferably, this selection function is laid out so as to pick one of the lockers with a "free" status randomly. The controller may then be laid out so as to control the opening of the selected locker and/or for controlling the display of the address of this locker for the depositor.

After depositing the packet 45 inside the locker and closing the latter, the first signature of the packet 45 may be written into the allocation table, in connection with the address datum of the locker. This first signature has preferably been read during the introduction into the locker. As a replacement, this signature may be read by means of a single reader, common to the whole of the lockers 54. For example, the controller 58 may be laid out so as to interpret the reading of the signature of a packet as a deposition instruction.

The consignee of the packet turns up at the whole of the lockers 54, provided with his/her private key. The reading of this private key or the entering of the latter, controls a "packet withdrawal" order. The controller is laid out so as to test the consistency of this private key with each of the signatures maintained in the allocation table, in order to determine the address of the locker housing the packet of the consignee. This amounts to testing the integrity of each of the second aggregated objects, the integrity of the first aggregated object included in the second aggregated object having already been checked and its signature stored in memory. If one of the second aggregated objects is estimated to be entire, the address of the corresponding locker is sent back to the controller 58 which authorizes the opening of it. Optionally, this controller 58 controls the opening of it.

The whole of the lockers, or compartments, may assume the form of a cabinet or locker shelves, or any other form.

The use of aggregated objects for controlling the opening and the closing of a left-luggage locker in particular provides the possibility of allocating a locker without there being needed to transmit the address datum of the locker used to the user.

This address datum does not either have to be affixed on the packet. And the selection of the locker may be random.

An attacker ready to force a locker by physically breaking in, for obtaining a particular stored packet does not have any possibility of knowing the relevant locker.

Incidentally, a closed locker may either contain a packet or not, without it being possible of knowing this from the outside. In this, this application differs from lockers with queued allocation or more generally according to a known sequence.

Finally, only the private key and in particular embodiments, the signature of the elements of the packet give the possibility of finding the locker housing the relevant packet.

Such a property significantly reinforces the security of the lockers. This security may further be increased by conditioning the opening of the door of the premises containing these lockers to the presence in these lockers of a packet forming an entire aggregate with the bearer of the private key label.

Checking the integrity of an aggregated object may be extended to several lockers. In other words, an aggregated object 1 may be distributed over several different lockers. In this case, the door of each of these lockers can only be closed, respectively opened when the aggregated object 1 has been deemed to be entire.

These lockers may be installed in very different locations, such as halls, lobbies, specific premises such as post offices, underground stations, close to or inside street furniture elements, such as bus stops, depots for renting bicycles, and other elements.

It is understood that this is a particular application here which does not limit the scope of the possible applications of such a system. For example, the packet may assume the form of a letter of confidential nature. The first and second aggregated object may be used for controlling the opening of doors or more generally for controlling access to particular spaces, in which at least one associated aggregated object is found. For example, it is thereby possible to control access to a closed parking space protecting a rental vehicle.

In addition to an aggregated object 1 maintained in a particular locker, it is possible to form a second aggregated object 2 consisting of each of the particular lockers housing the aggregated objects 1 related to each other. For example, the whole of the packet 45 have a same consignee. In this case, the second aggregated object 2 and the relevant consignee may form a third aggregated object.

A particularly interesting application may be found in the field of air transportation. An airline may want to provide a service for forwarding secured luggage to travelers who do not desire that some of their luggage travel in the hold, but who cannot keep them in the cabin. The traveler affixes labels on this luggage and deposits them in containers of small dimensions, several pieces of luggage or objects may be housed in a same container. The whole of the containers used for a same traveler forms a first aggregated object 1. This first object and the traveler form a second aggregated object 1. At the end of the flight, the whole of the containers is arranged in one or more lockers, the opening of which is controlled in a way similar to what has been described above. These lockers may advantageously be laid out in proximity to the location where the remainder of the luggage of the traveler is withdrawn.

In the exemplary applications given above, like in other applications of the invention, the monitoring of aggregated objects 1 or of a given space 11 may be accomplished in a non-continuous way: checking the integrity may be achieved in particular geographic locations, at particular instants of time, and/or upon triggering of a particular event, including human intervention. This notably allows monitoring involving reduced energy consumptions.

The invention has been described in the form of a monitoring device. However the latter invention may also be considered as a method for monitoring physical objects, comprising the following steps:

i) providing a set of memory elements intended to be affixed to physical objects, each of these elements storing an individual identifier which is specific to it, and at least some of them storing object description data, ii) acquiring the data contained in memory elements present in the proximity of one or more remote readers, iii) distinguishing in the acquired data individual identifiers and object description data iv) checking the sufficiency of the group description data v) checking the compliance of the individual identifiers with the corresponding group description data.

The invention is not limited to the embodiments described earlier, only as examples, but encompasses the whole of the alternatives which may be contemplated by one skilled in the art. In particular:

For purposes of illustration, a distribution of the data in different memory areas of the labels 5 according to the meaning of these data was described. In practice, a label may only comprise an identifier consisting of the juxtaposition of different data. This identifier may assume the form of a chain of characters consisting of the juxtaposition of an individual identifier, of an object identifier, of a master label attribute definition, and/or of an object cardinal.

The master label may be distinct from the label including the object description data. In this case, additional test conditions may be provided depending on the presence in the labels of either one of these labels, or even on their simultaneous presence.

Each label may be programmed with a limiting either absolute or relative date of validity, in order to avoid that old labels, presently meaningless, be read and processed by the monitoring device of the invention.

In certain cases, the object identifier data, in particular when they assume the form of a signature, may form the whole or part of the individual identifier data of one of the constitutive labels of the relevant object.

A same controller 15 may be laid out so as to monitor several unconnected given spaces, each of these spaces being provided with at least one label reader 13 connected to said controller. For example, a first space may be formed by the passenger compartment of a bus and the second by the luggage hold of this bus: the monitoring device 1 may then be provided for checking the luggage in both of these spaces considered as forming together a space to be monitored.

This controller 15 may be at a distance from the space(s) to be monitored, including made in the form of a "remote" machine in the sense generally understood in computing.

The master label may be duplicated for example so that a set of luggage pieces may be associated with several bearers, typically a family. More generally, any label may be duplicated when this seems necessary. In other words, distinct labels may store in memory identical data, including the individual identifier E_ID data for example, this may be useful when it is desired to perform monitoring on classes of physical objects, rather than on distinctive physical objects: a class of physical objects may be built by assigning identical data to the set of labels intended for the objects of the relevant class.

Labels associated with different aggregated objects 1 may be affixed on a same physical object. For example, an individual may bear several master labels, one associated with an aggregated object 1 formed by his/her heaviest pieces of luggage. In this case, programming a single label 5 may be contemplated so that it includes data of appurtenance to several aggregated objects 1.

The label reader 13 may assume the form of a portable reader or at least a mobile reader, for example in order to check the integrity of aggregated objects 1 associated with one or more bulky physical objects, or difficult to move.

The controller may be integrated to one of the physical objects, the integrity of which is intended to be checked, or at least be physically associated with these physical objects. In this case, only the connection of a label reader to this controller is further necessary for checking integrity. In this case, the controller advantageously assumes the form of a suitably programmed micro-controller. For example, when the question is of checking the integrity of an aggregated object formed with several packets contained in a same container, the controller may also be positioned inside this container. The label reader may assume the form of a gantry, for example moving relatively to the container, which has just been connected to said controller. For this purpose, a connector may be positioned on the container, which is accessible from the outside of the latter. This may give the possibility of having the integrity checked by a third party organization, without opening the relevant container and without disclosing any information specific to the aggregated object 1.

The label reader 13 may itself belong to an aggregated object 1. In this case, a label 13 may be associated with this reader. In the case when labels of the RFID type operating within the NFC framework are used, the label reader 13 may assume the form of a portable telephone compatible with this standard. In this case, this telephone may be laid out so as to "emulate" the behavior of an RFID label, possibly in an active way, which avoids that such a label is affixed on the telephone.

More generally, one or more of the constitutive labels of an aggregated object may assume the form of a mobile terminal, typically a portable telephone, capable of reproducing the behavior of this label, as this is the case for telephones capable of operating according to the NFC standard. The programming of the corresponding "label" may then comprise the reception of a message including the different data to be stored in memory (notably the elementary identifier E_ID data) and received via one of the different communications means with which the telephone is equipped, for example as a so-called "SMS" (Short Message Service) message. The data stored in memory in the telephone may comprise signature data, i.e. aggregate object description data. The terminal used may be absent during the generation of the aggregated object, for example replaced with a "proxy" label or by the use of a public key (for generation) and private key pair, attached to the terminal, for checking the integrity.

In certain cases, the reading of a label may be inhibited, for example by positioning the latter inside an electromagnetic shielding cover (an aluminum sheet casing for example). In particular, it is possible to thereby inhibit reading of a duplicated label from a constitutive label of an aggregated object in order to have a duplicate of the latter label. This duplicated label may physically belong to one of the physical objects corresponding to the relevant aggregated object, and be activated, if necessary by removing the electromagnetic shielding cover. Such a duplicated label, housed in a cover, may advantageously be positioned in a packet, the integrity of which is intended to be checked, for the case when the relevant packet should be sent back. In other words, the integrity of the packet may then be checked both upon initial shipment and upon its return, even if the label initially including aggregated object description data has become illegible (which is the case when destruction of this label is foreseen upon opening the packet).

The device may be applied for monitoring physical objects of very different nature. Thus, the device may for example be applied:

in a museum, in order to make sure that a group of visitors is complete upon passing from one room into another, at the exit of a car park, in order to make sure that the person who leaves the car park actually corresponds to the vehicle which he/she uses for exiting, in buildings, in order to make sure that a visitor is always accompanied, in particular in sensitive areas, in the field of health care, in order to make sure that a set of boxes of drugs corresponds to a prescription, in a meeting room, documents of the meeting deemed to be confidential being labeled so as to make sure that the person in charge of the meeting leaves this room with the whole of these documents and/or that no other person leaves said room with any of these confidential documents, in a location for handing over any physical object, such as a location for handing over keys, for example the reception of a hotel, in order to check the consistency of the handed-over object and of the person receiving this object, in a luggage locker, the clothes and/or the luggage being labeled so as to form with their owner a same aggregated object, in a shop, in order to make sure that the person to whom a product subject to sale restrictions is entrusted, such as alcohol or tobacco, is actually the person which passes with this product at the cash desk or that a person who passes such a product at the cash desk is actually the person to whom this product was entrusted, in a hotel, in order to check that a customer does not leave without an essential portion of his/her luggage, for example his/her wallet, (it is checked that the object is at least partly entire) and/or does not leave the hotel without the whole of his/her luggage (it is checked whether the object is totally entire when the customer leaves), or further, in a library or in archives, in order to check that the person who bears a particular document is actually authorized to do this: object classes may then be built, as explained above so that all the authorized persons are provided with labels including identical data, on the one hand and that all the documents on the other hand are also provided with identical labels, the whole of the documents may if necessary be divided into several classes of documents.

It will be noted that the device according to the invention allows checking of the integrity of an aggregated object both when this integrity is a priori desirable, as in the example described above and when this integrity has to be avoided, in particular when the question is of making sure that particular distinct physical objects are not simultaneously present in a same physical space, as this may be the case for chemicals or drugs for example.

The data collected by or for the controller of the device according to the invention may be used, addressed, processed, stored or completed by other devices belonging to a same information network, or to a distinct network, for all useful purposes, in particular statistical purposes.

Annex 1
A.1.1

```
on detection (id,ts) do
    Log.append((id, ts))
    if id.gid in list_pending then
        return
    else
        list_pending.add (id.gid) prog_check((id,ts),ts+delta_trans)
    endif
done
```

A.1.2
procedure prog_check ((id,ts), date_trigger)
A.1.3

```
procedure Check (idO,ts0)
    group := vide
    foreach (id,ts) in Log such as
        id.gid = idO.gid and
        ts0-ts < Delta_trans
        group := group + (id, ts)
    done
    result := Check_Group(group)
    list_pending.delete(id.gid);
    case result of
        ok_total: do something...
        ok_partial: ...
        master_missing: ...
        check_failed: ...
endproc
```

Annex 2
A.2.1

```
on detection A-B (id,ts) do
    LogAB.append((id,ts) )
    if id.gid in list_pendingAB then
        return;
    else
        list_pendingAB.add (id.gid)
        prog_checkAB((id,ts), ts+delta_trans)
    endif
done
```

A.2.2

```
on detection B-A (id,ts) do
    LogBA.append((id,ts))
    if id.gid in list_pendingBA then
        return;
    else
        list_pendingBA.add (id.gid)
        prog_checkBA((id,ts), ts+delta_trans)
    endif
done
```

A.2.3
procedure prog_checkAB ((id,ts), date_trigger) procedure prog_checkBA ((id,ts), date_trigger)
A.2.4

```
procedure Check_AB (id0,ts0)
    group := void
    foreach (id,ts) in LogAB such as
        id.gid = id0.gid
        and ts0-ts < Delta_trans
        group := group + (id, ts)
    done
    result := Check_Group(group)
    list_pendingAB.delete(id.gid)
    case result of
        ok_total: do something...
        ok_partial: ...
        master_missing: ...
        check_failed: ...
endproc
```

A.2.5

```
procedure Check_BA (id0,ts0)
    group := void
    foreach (id,ts) in LogBA such as
        id.gid = id0.gid
        and ts0-ts < Delta_trans
        group := group + (id, ts)
    done
    result := Check_Group(group)
    list_pendingBA.delete(id.gid)
```

-continued

```
            case result of
               ok_total: do something...
               ok_partial: ...
               master_missing: ...
               check_failed: ...
        endproc
```

Annex 3
A.3.1

```
            on detection (id,ts) do
            Log.append((id, ts))
               if    id.gid in list_pending then
                     return
                  else
                     list_pending.add (id.gid)
                     prog_check((id,ts),ts+delta_trans)
                  endif
            done
```

A.3.2
procedure prog_check ((id,ts), date_trigger)
A.3.3

```
      procedure Check (id0,ts0)
         group := void
         foreach (id,ts) in Log such as
               id.gid = idO.gid and ts0-ts < Delta_trans
               group := group + (id, ts)
         done
         foreach (id,ts) in Log such as
               id.gid2 = idO.gid and ts0-ts < Delta_trans
            result := check(id,now)
               if (result == ok_partial || ok_total)
                  group := group + (id.gid,ts)
               endif
         done
         result := Check_Group(group) list_pending.delete(id.gid);
         case result of
         ok_total: do something...
         ok_partial: ...
         master_missing: ...
         check_failed: ...
         return result
      endproc
```

Annex 4
A.4.1

```
            on detection (id,ts) do Log.append((id,ts))
            if id.gid in list_pending then
                  return
               else
                  list_pending.add (id.gid)
                  prog_check((id, ts), ts+delta_trans)
               endif
            done
```

A.4.2
procedure prog_check ((id,ts), date_trigger)
A.4.3

```
         procedure Check (id0,ts0)
            group := void
            foreach (id,ts) in Log such as
               (id.gid = idO.gid or id.gid2 = idO.gid) and
               ts0-ts < Delta_trans
               group := group + (id, ts)
            done
```

A.4.4

```
            result := Check_Group(group)
            list_pending.delete(id.gid);
               case result of
                  ok_total: do something...
                  ok_partial: ...
                  master_missing: ...
                  check_failed: ...
```

A.4.5

```
                     return result
                  endproc
               done
```

The invention claimed is:

1. A system for autonomously monitoring physical objects comprising:
    (a) a set of passive radiofrequency tags, each being attached to a respective member of a group of physical objects to monitor, each passive radiofrequency tag comprising a respective memory that stores a specific individual identifier, the respective memory of at least one of the set of passive radiofrequency tags further storing group description data, wherein the group description data comprise a first value that results from a first hash function called with the specific individual identifiers of the set of passive radiofrequency tags,
    (b) at least one short-range radiofrequency tag reader cooperating with the passive radiofrequency tags whose physical objects are physically presented to said at least one short range radiofrequency tag reader, and
    (c) a controller configured to:
        execute a reading function by said at least one short-range radiofrequency tag reader to acquire the specific individual identifiers and the group description data from the memories of the passive radiofrequency tags whose physical objects are physically presented to said at least one short-range radiofrequency tag reader,
        execute an integrity validation function comprising utilizing a second hash function on the specific individual identifiers obtained by the reading function to generate a second value of the group description data, wherein the second hash function is compatible with the first hash function, wherein the integrity validation function further compares said second value of the group description data to said first value of the group description data to determine whether the second value of the group description data complies with the first value of the group description data, and
        determine when the group description data from the reading function match the group description data stored in the at least one of the set of passive radiofrequency tags, and when the individual identifiers from the reading function match with the corresponding group description data from the reading function.

2. The system according to claim 1, wherein the integrity validation function is configured to transmit a first alarm when the second value of the group description data is not consistent with the first value of the group description data.

3. The system according to claim 1, wherein the integrity validation function is configured to transmit a second alarm when the individual identifiers from the reading function do not comply with the group description data from the reading function.

4. The system according to claim 1, wherein the group description data comprise group identifier data and group cardinal data in the group description data, and the integrity validation function associates each group identifier data from the reading function with at least one specific individual identifier from the reading function, wherein the integrity validation function counts the specific individual identifiers relating to at least one of the group identifier data to obtain an identifier number and then compares a said identifier number to the group cardinal data from the reading function to check whether the specific individual identifiers from the reading function comply with the group description data.

5. The system according to claim 1, wherein the at least one short-range radiofrequency tag reader is positioned to read any of the set of passive radiofrequency tags that is located in a given physical space.

6. The system according to claim 5, wherein said given physical space appears as an enclosure, and an opening or a closing of said enclosure is electronically controlled, wherein the opening or the closing of said enclosure is authorized depending on whether the individual identifiers from the reading function comply with the group description data from the reading function.

7. The system according to claim 1, wherein the at least one short-range radiofrequency tag reader is positioned at an entrance and an exit of a given physical space, and the at least one short-range radiofrequency tag reader reads any of the set of passive radiofrequency tags entering the given physical space and any of the set of passive radiofrequency tags exiting the given physical space, wherein the controller further controls the entrance and the exit of the given physical space based on said second value.

8. The system according to claim 1, wherein the controller further assigns a reading date to the specific individual identifiers from the reading function, and wherein the controller executes the integrity validation function only on the specific individual identifiers whose date is comprised within a determined time interval.

9. The system according to claim 1, wherein the controller further classifies the specific individual identifiers from the reading function into at least two complementary data sets, and wherein the integrity validation function is executed distinctly on the at least two complementary data sets.

10. The system according to claim 9, wherein the controller is configured to determine a direction of displacement of the set of passive radiofrequency tags whose physical objects are physically presented to the said at least one short-range radiofrequency tag reader, said direction of displacement being determined among a plurality of directions of displacement, and wherein the controller classifies the specific individual identifiers from the reading function into the at least two complementary data sets according to the direction of displacement of the set of passive radiofrequency tags from which specific individual identifier is acquired.

11. The system according to claim 1, wherein the controller is configured to execute the integrity validation function each time after the controller executes the reading function.

12. The system according to claim 1, wherein the controller is configured to execute a function for recovering additional data, wherein the integrity validation function is further configured to distinguish one or more additional individual identifiers in the additional data, and wherein the controller checks whether the specific individual identifiers from the reading function and the additional individual identifiers comply with the group description data.

13. The system according to claim 1, wherein the integrity validation function is configured to distinguish first group description data and second group description data in the group description data, and the integrity validation function checks whether at least some of the first group description data and the second group description data are consistent, while checking whether the individual identifiers from the reading function comply with the first group description data and with the second group description data.

14. A system for autonomously monitoring physical objects comprising:
   a set of passive radiofrequency tags, each comprising a respective memory, wherein each set of passive radiofrequency tags are attached to one of a respective group of physical objects to monitor, and
   at least one short-range radiofrequency tag reader cooperating with the set of passive radiofrequency tags whose physical objects are physically presented to the said at least one short-range radiofrequency tag reader, and
   a controller configured to execute a writing function cooperating with the at least one short-range radiofrequency tag reader to write specific individual identifiers into the respective memory of the set of passive radiofrequency tags whose physical objects are physically presented to the said at least one short-range radiofrequency tag reader and group description data into the respective memory of at least some of the set of passive radiofrequency tags whose physical objects are physically presented to the said at least one short-range radiofrequency tag reader, wherein the group description data comprise a value resulting from a hash function called with the specific individual identifiers of the set of passive radiofrequency tags whose physical objects are physically presented to the said at least one short-range radiofrequency tag reader, wherein the group description data are established based on both the specific individual identifiers and additional individual identifier data, wherein the additional individual identifier data comprise a public key and the specific individual identifier data comprise a private key and wherein the public key and the private key correspond to each other.

15. The system according to claim 14, wherein the specific individual identifiers comprise group description data.

16. The system according to claim 14, wherein the writing function is configured to cooperate with the at least one short-range radiofrequency tag reader to write private keys as specific individual identifiers into the memory of the set of passive radiofrequency tags whose physical objects are physically presented to the at least one short-range radiofrequency tag reader.

17. The system according to claim 14, wherein the controller is configured to:
   execute a reading function configured to cooperate with the at least one short-range radiofrequency tag reader to acquire data contained in the memory of the set of passive radiofrequency tags whose physical objects are physically presented to the at least one short-range radiofrequency tag reader, and to distinguish specific individual identifiers for each passive radiofrequency tag in said data, and
   execute a writing function configured to cooperate with the at least one short-range radiofrequency tag reader to write group description data into the memory of at least some of the set of passive radiofrequency tags whose physical objects are physically presented to the at least one short-range radiofrequency tag reader.

18. The system according to claim 17, wherein the controller is configured to:

execute a reading function configured to cooperate with the at least one short-range radiofrequency tag reader to acquire data contained the memories of the set of passive radiofrequency tags, and to distinguish specific individual identifiers for each of the set of radiofrequency tags in said data, and execute a writing function that cooperates with the at least one short-range radiofrequency tag reader to write group description data into at least some of the passive radiofrequency tags whose physical object is presented to the at least one short-range radiofrequency tag reader, wherein the group description data are established based on specific individual identifiers of the passive radiofrequency tags.

19. The system according to claim 18, wherein the specific individual identifier comprises a private key, and the group description data are established to be checked in terms of compliance with a public key as an individual identifier as a replacement of the private key of the specific individual identifier.

20. A method for autonomously monitoring physical objects comprising:
A. a preliminary writing stage comprising the steps of:
A1. providing a set of passive radiofrequency tags, each to be attached to one respective of a group of physical objects to be monitored, each passive radiofrequency tag comprising a respective memory storing a specific individual identifier,
A2. calling a first hash function with the specific individual identifiers stored in the respective memories of the set of passive radiofrequency tags to generate group description data comprising a first value,
A3. storing the group description data comprising the first value into the respective memory of at least one of the set of passive radiofrequency tags;
B. a later verification stage comprising the steps of:
B1. acquiring specific individual identifiers and group description data from the memories of the passive radiofrequency tags whose physical objects are physically presented to at least one short-range radiofrequency tag reader, wherein the at least one short-range radiofrequency tag reader is positioned to read any of the set of passive radiofrequency tags that is located in a given physical space,
B2. calling a second hash function with the individual identifiers of step B1 to generate a result second value, the second hash function being analogous or compliant with the first hash function,
B3. comparing the result second value of step B2 to the first value of step A2, and
B4. checking whether the group description data of step B1 comply with the group description data of step A2 and whether the individual identifiers of step B1 comply with the group description data of step B1.

* * * * *